US010696829B2

(12) United States Patent
Marques Ferreira Custodio et al.

(10) Patent No.: US 10,696,829 B2
(45) Date of Patent: Jun. 30, 2020

(54) HETEROPHASIC PROPYLENE COPOLYMER

(71) Applicants: SAUDI BASIC INDUSTRIES CORPORATION, Riyadh (SA); SABIC GLOBAL TECHNOLOGIES B.V., Bergen op Zoom (NL); Frederico José Marques Ferreira Custodio, Leiria (PT); Vaidyanath Ramakrishnan, Bergen op Zoom (NL); Franciscus Elisabeth Jacobus Essers, Maastricht (NL); Pieter Valkier, Sittard (NL); Benoit Thérése Philippe Lecouvet, Schaerbeek (BE)

(72) Inventors: Frederico José Marques Ferreira Custodio, Leiria (PT); Vaidyanath Ramakrishnan, Bergen op Zoom (NL); Franciscus Elisabeth Jacobus Essers, Maastricht (NL); Pieter Valkier, Sittard (NL); Benoit Thérése Philippe Lecouvet, Schaerbeek (BE)

(73) Assignees: SAUDI BASIC INDUSTRIES CORPORATION, Riyadh (SA); SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/106,570

(22) PCT Filed: Dec. 18, 2014

(86) PCT No.: PCT/EP2014/078483
§ 371 (c)(1),
(2) Date: Jun. 20, 2016

(87) PCT Pub. No.: WO2015/091810
PCT Pub. Date: Jun. 25, 2015

(65) Prior Publication Data
US 2016/0326355 A1    Nov. 10, 2016

(30) Foreign Application Priority Data

Dec. 20, 2013 (EP) .................................. 13199168

(51) Int. Cl.
*C08L 23/12* (2006.01)

(52) U.S. Cl.
CPC .......... *C08L 23/12* (2013.01); *C08L 2207/02* (2013.01)

(58) Field of Classification Search
CPC ...................................................... C08L 23/12
See application file for complete search history.

(56) References Cited

U.S. PATENT DOCUMENTS 4,399,054 A  8/1983 Ferraris et al.
4,414,132 A  11/1983 Goodall et al.
(Continued)

FOREIGN PATENT DOCUMENTS

EP    0019330 A1    11/1980
EP    0398698 A2    11/1990
(Continued)

OTHER PUBLICATIONS

Hirano et al., "Morphological Analysis of the Tiger Stripe on Injection Molding of Polypropylene/Ethylene-Propylene Rubber/Talc Blends Dependent on Based Polypropylene Design," J. Applied Polym. Sci. vol. 104, 192-199 (2007).
(Continued)

*Primary Examiner* — Arrie L Reuther
(74) *Attorney, Agent, or Firm* — Cantor Colburn LLP

(57) ABSTRACT

The invention relates to a heterophasic propylene copolymer comprising a matrix phase comprising a propylene polymer and a dispersed phase comprising an ethylene-α-olefin elastomer comprising ethylene and at least one $C_3$ to $C_{10}$ olefin, wherein the propylene polymer has a melt flow index of at least 200 dg/min or at least 150 dg/min as determined by
(Continued)

Figure 1:
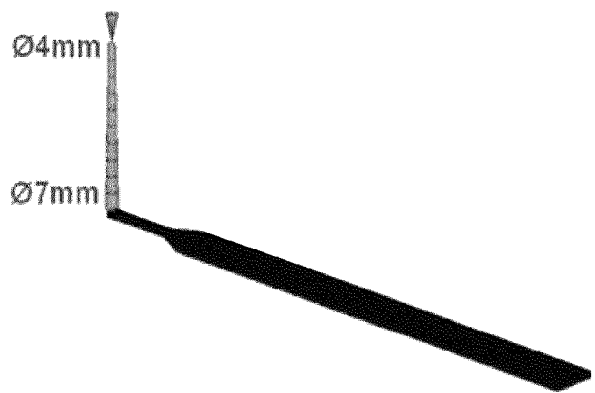

ISO1 133:2005 at 230° C. and 2.16 kg, wherein the propylene polymer has an intrinsic viscosity $IV_{PP}$ and the ethylene-α-olefin elastomer has an intrinsic viscosity $IV_{EPR}$ where the ratio of $IV_{EPR}/IV_{PP}$ is 3-7, wherein the copolymer comprises 8-20 wt % or 20-30 wt % of the ethylene-a-olefin elastomer, wherein the ethylene-a-olefin elastomer of the dispersed phase comprises 10-55 wt % of ethylene.

20 Claims, 1 Drawing Sheet

(56) References Cited

U.S. PATENT DOCUMENTS

| | | | |
|---|---|---|---|
| 4,472,524 | A | 9/1984 | Albizzati |
| 4,579,836 | A | 4/1986 | Azoumanidis et al. |
| 4,612,299 | A | 9/1986 | Azroumanidis et al. |
| 4,771,024 | A | 9/1988 | Nestlerode et al. |
| 4,866,022 | A | 9/1989 | Arzoumanidis et al. |
| 4,950,720 | A | 8/1990 | Randall, Jr. et al. |
| 4,978,648 | A | 12/1990 | Barbe et al. |
| 5,066,737 | A | 11/1991 | Job |
| 5,077,357 | A | 12/1991 | Job |
| 5,093,415 | A | 3/1992 | Brady, III et al. |
| 5,106,806 | A | 4/1992 | Job |
| 5,218,047 | A | 6/1993 | Schwager et al. |
| 5,556,820 | A | 9/1996 | Funabashi et al. |
| 5,567,665 | A | 10/1996 | Wagner et al. |
| 6,268,306 | B1 | 7/2001 | Zakharov et al. |
| 6,300,415 | B1 | 10/2001 | Okayama et al. |
| 6,384,142 | B1 | 5/2002 | Burkhardt et al. |
| 6,395,670 | B1 | 5/2002 | Morini et al. |
| 6,799,568 | B2 | 10/2004 | Zakharov et al. |
| 6,825,146 | B2 | 11/2004 | Kilty et al. |
| 7,947,788 | B2 | 5/2011 | Ramjoie et al. |
| 8,618,220 | B2 | 12/2013 | Reijntjens et al. |
| 8,716,387 | B2 | 5/2014 | Posch et al. |
| 2001/0012874 | A1 | 8/2001 | Huffer et al. |
| 2002/0035209 | A1 | 3/2002 | Kanzaki et al. |
| 2002/0040105 | A1* | 4/2002 | Kanzaki ............... C08L 23/12 525/240 |
| 2003/0195299 | A1 | 10/2003 | Stevens et al. |
| 2004/0044107 | A1 | 3/2004 | Kikuchi et al. |
| 2005/0261434 | A1 | 11/2005 | Yaras et al. |
| 2010/0048807 | A1 | 2/2010 | Masarati et al. |
| 2012/0157599 | A1 | 6/2012 | Doufas et al. |
| 2017/0002188 | A1 | 1/2017 | Neuteboom et al. |

FOREIGN PATENT DOCUMENTS

| | | |
|---|---|---|
| EP | 1273595 A1 | 1/2003 |
| EP | 1283222 A1 | 2/2003 |
| EP | 1336625 A1 | 8/2003 |
| EP | 1354901 A1 | 10/2003 |
| EP | 1647575 A1 | 4/2006 |
| EP | 1672021 A1 | 6/2006 |
| EP | 1781737 B1 | 5/2007 |
| EP | 2154194 A1 | 2/2010 |
| EP | 2308923 B1 | 5/2012 |
| EP | 2495280 A1 | 9/2012 |
| WO | 9632426 A1 | 10/1996 |
| WO | 9632427 A1 | 10/1996 |
| WO | 9845338 A1 | 10/1998 |
| WO | 0123441 A1 | 4/2001 |
| WO | 0228958 A1 | 4/2002 |
| WO | 03051984 A1 | 6/2003 |
| WO | 03068828 A1 | 8/2003 |
| WO | 03106553 A1 | 12/2003 |
| WO | 2004087805 A1 | 10/2004 |
| WO | 2006010414 A1 | 2/2006 |
| WO | 2006056338 A1 | 6/2006 |
| WO | 2007134851 A1 | 11/2007 |
| WO | 2008074715 A1 | 6/2008 |
| WO | 2009153213 A1 | 12/2009 |
| WO | 2010108866 A1 | 9/2010 |
| WO | 2011036016 A1 | 3/2011 |
| WO | 2012117086 A1 | 9/2012 |
| WO | 2013010879 A1 | 1/2013 |
| WO | 2013079539 A1 | 6/2013 |

OTHER PUBLICATIONS

Hirano et al., "Morphological Analysis of Tiger-Stripe and Striped Pattern Deterioration on Injection Molding of Polypropylene/Rubber/Talc Blends," (Jan. 22, 2007) 2 Pages.

International Preliminary Report on Patentability for International Application No. PCT/EP2014/078483; International Filing Date: Dec. 18, 2014; dated Jun. 21, 2016; 7 Pages.

International Search Report for International Application No. PCT/EP2014/078483; International Filing Date: Dec. 18, 2014; dated Mar. 27, 2015; 4 Pages.

Maeda et al., "Flow Mark in the Injection Molding of Polypropylene/Rubber/Talc Blends," Journal of the Society of Rheology vol. 35, No. 5 (2007), pp. 293-299.

Maier, C. et al.: "Polypropylene—The Definitive User's Guide and Databook"; William Andrew Publishing/Plastics Design Library; Norwich NY; 1998; 2 Pages.

Patham et al, "Flow Marks in Injection Molding of Polypropylene and Ethylene-Propylene Elastomer Blends: Analysis of Morphology and Rheology," Published Online in Wiley InterScience (www.interscience.wiley.com) Sep. 2004; 12 Pages.

Ser van der Ven "Polypropylene and Other Polyolefins: Polymerization and Characterization," Studies in Polymer Science, Elsevier (1990) 11 Pages.

Written Opinion of the International Searching Authority for International Application No. PCT/EP2014/078483; International Filing Date: Dec. 18, 2014; dated Mar. 27, 2015; 5 Pages.

* cited by examiner

HETEROPHASIC PROPYLENE COPOLYMER

CROSS REFERENCE TO RELATED APPLICATIONS

This application is a 371 of International Application No. PCT/EP2014/078483, filed Dec. 18, 2014, which claims priority to European Application No. 13199168.9, filed Dec. 20, 2013 which are incorporated herein by reference in their entirety.

The invention relates to a heterophasic propylene copolymer and a heterophasic propylene composition comprising said heterophasic propylene copolymer. The invention further relates to use of such heterophasic propylene copolymer and heterophasic propylene composition. The invention further relates to a process for preparing such heterophasic propylene copolymer and heterophasic propylene composition.

A heterophasic propylene copolymer is known for use in various fields such as automobile articles due to its good mechanical properties such as impact strength. Many of these articles require a good surface appearance. A surface defect referred to as Tiger Stripes is highly undesirable due to unacceptable appearance. Tiger Stripes (flow marks) originate from a viscoelastic melt flow instability that typically occurs in relatively long injection molded parts, where alternate dull and glossy regions occur beyond a certain distance from the gate (onset distance to flow marks). Instability fundamentals that cause Tiger Stripes have been described in the literature [e.g., Hirano et al., J. Applied Polym. Sci. Vol. 104, 192-199 (2007); Pathan et al., J. Applied Polym. Sci. Vol. 96, 423-434 (2005); Maeda et al., Nihon Reoroji Gakkaishi Vol. 35, 293-299 (2007)].

US2012/0157599 discloses an impact copolymer polypropylene (ICP) composition comprising a propylene-based matrix and a propylene/ethylene or other propylene/α-olefin copolymer rubber phase. The composition of US2012/0157599 has a low value of loss tangent. US2012/0157599 mentions that its composition exhibits improved external appearance manifested by enhanced tiger (flow) marking performance, i.e. less visible tiger stripes in long molded parts, combined with a low gels count and enhanced mold flowability.

US2005/0261434 discloses a thermoplastic elastomer blend with reduced surface defects comprising a high flow, propylene-based resin, about 0.01 to 15 weight percent of a processability modifier component, and about 1 to 50 weight percent of an ethylene-based toughening component.

EP1647575 discloses a polypropylene resin composition which is free from flow mark or weld mark, comprising a crystalline propylene block copolymer, an elastomeric polymer and an inorganic filler and having a certain Izod impact strength.

There is still an ongoing demand for a heterophasic propylene copolymer with reduced surface defects, especially for example with reduced tiger stripes.

It is an object of the invention to provide a heterophasic propylene copolymer with excellent tiger marking performance, meaning a reduced tiger stripe visibility, which is preferably suitable for impact resistant applications.

The objective is achieved according to the invention with a heterophasic propylene copolymer comprising a matrix phase comprising a propylene polymer and a dispersed phase comprising an ethylene-α-olefin elastomer comprising ethylene and at least one $C_3$ to $C_{10}$ α-olefin, wherein the propylene polymer has a melt flow index (MFI) of at least 200 dg/min or at least 150 dg/min as determined by ISO1133:2005 at 230° C. and 2.16 kg,
wherein the propylene polymer has an intrinsic viscosity $IV_{PP}$ and the ethylene-α-olefin elastomer has an intrinsic viscosity $IV_{EPR}$, wherein the ratio of $IV_{EPR}/IV_{PP}$ is 3-7,
wherein the copolymer comprises 80-92 wt % of the propylene polymer and 8-20 wt % or 20-30 wt % of the ethylene-α-olefin elastomer based on the weight of the heterophasic propylene copolymer,
wherein the ethylene-α-olefin elastomer of the dispersed phase comprises 10-55 wt % of ethylene and 45-90 wt % of the at least one $C_3$ to $C_{10}$ α-olefin based on the weight of the ethylene-α-olefin elastomer.

It was surprisingly found that the heterophasic propylene copolymer of the present invention has a better appearance and that tiger stripes are less or even non-existent in the copolymer, while also having good mechanical properties.

It is noted that US2002040105 discloses a polypropylene resin composition comprising a propylene homopolymer (A) and a propylene-ethylene block copolymer (B). The block copolymer (B) comprises a propylene homopolymer fraction and a propylene-ethylene random copolymer fraction. The propylene portion in the polypropylene resin composition is made from the propylene homopolymer (A) and the propylene homopolymer portion of the block copolymer (B). The MFI of the propylene portion in the polypropylene resin composition is not mentioned.

It is further noted that Hirano et. al, Journal of Applied Polymer Science, Vol. 104, 192-199 (2007) describes tiger striping on injection molding of an impact type polypropylene/ethylene-propylene rubber/talc blend. It is mentioned that increasing the intrinsic viscosity of the ethylene-propylene rubber portion of the PP is an effective design factor for restricting the deformation against shear strain during injection process by giving the dispersed phase high elasticity. However, the MFI and the intrinsic viscosity of the PP are not mentioned. The amount of the ethylene-propylene rubber in the PP is not mentioned. The ethylene content of the ethylene-propylene rubber is not mentioned. It is well-known that the properties and behaviors of a heterophasic propylene copolymer substantially vary depending on its specific components. Teachings of this document cannot be generally applied to heterophasic propylene copolymers having different MFI of PP, different amount of ethylene-propylene rubber and different ethylene content of ethylene-propylene rubber.

A heterophasic propylene copolymer basically has at least a two-phase structure, consisting of a propylene-based semi-crystalline matrix and a dispersed elastomer phase, typically an ethylene-propylene rubber (EPR). These polypropylene copolymers are generally prepared in one or more reactors, by polymerization of propylene in the presence of a catalyst system, and subsequent polymerization of a propylene-ethylene mixture; but can also be made by blending different (co)polymers. The resulting polymeric materials are heterophasic; studies have demonstrated the presence of four phases in heterophasic propylene-based copolymers: crystalline polypropylene, amorphous polypropylene, crystalline ethylene-propylene rubber, and amorphous ethylene-propylene rubber. The advantage of such polymer is improved impact resistance, especially at lower temperatures.

The propylene polymer of the matrix phase of the heterophasic propylene copolymer according to the invention can preferably have a relatively high MFI of for example at least 150 dg/min, preferably at least 160 dg/min, more preferably at least 180 dg/min or even more preferred at least 200 dg/min, 210 dg/min or 220 dg/min. This has an advantage of good processability, high throughput and/or reduction of cycle times. Preferably, the propylene polymer of the matrix phase of the heterophasic propylene copolymer according to the invention has a MFI of at most 300, at most 250. Most preferably, the propylene polymer of the matrix phase of the heterophasic propylene copolymer according to the invention has a MFI of at least 180-230 dg/min.

When the proportion of the ethylene-α-olefin elastomer present in the heterophasic propylene copolymer is too high, i.e. more than 20 wt %, the tiger stripe performance degrades. When the proportion of the ethylene-α-olefin elastomer is too low, i.e. less than 8 wt %, the resulting composition has a low impact resistance. Preferably, the heterophasic propylene copolymer comprises from 82 to 90 wt % of the propylene polymer and from 10 to 18 wt % of the ethylene-α-olefin elastomer. This range results in a good balance regarding the reduction of the tiger stripe problem and good impact strength.

Generally, as the amount of the ethylene-α-olefin elastomer in the heterophasic propylene copolymer is increased, the impact resistance of the copolymer is increased and the tiger stripe performance tends to degrade. According to the present invention, a good tiger stripe performance was surprisingly obtained even at a high proportion of the ethylene-α-olefin elastomer. In some embodiments of the invention, the copolymer can comprise for example 8-30 wt %, 8-25 wt %, 8-20 wt %, 12-20 wt %, 14-20 wt % or 15-20 wt % of the ethylene-α-olefin elastomer.

Preferably, the propylene polymer is a propylene homopolymer and/or a propylene copolymer comprising at least 90 wt % of propylene and up to 10 wt % of ethylene and/or at least one $C_4$ to $C_{10}$ α-olefin.

When the proportion of ethylene present in the dispersed phase is too high, i.e. more than 55 wt %, the tiger stripe performance degrades. When the proportion of ethylene in the dispersed phase is too low, i.e. less than 10 wt %, the resulting composition has a low impact resistance. Preferably, the ethylene-α-olefin elastomer comprises 40 to 50 wt % of ethylene and 50 to 60 wt % of at least one $C_3$ to $C_{10}$ α-olefin. This range results in a good balance between the reduction of the tiger stripe problem and a good impact/stiffness balance. Preferably, the at least one $C_3$ to $C_{10}$ α-olefin is propylene.

In some embodiments, the propylene polymer could however also be a propylene homopolymer.

The propylene polymer has an intrinsic viscosity $IV_{PP}$ and the ethylene-α-olefin elastomer has an intrinsic viscosity $IV_{EPR}$, wherein the ratio of $IV_{EPR}/IV_{PP}$ can be for example 3-7, preferably 3-5. $IV_{PP}$ and $IV_{EPR}$ are determined according to ISO-1628-1 and -3 based on the amount of the xylene-soluble matter (CXS) and xylene-insoluble matter (CXI) measured according to ISO 16152:2005.

Preferably, $IV_{EPR}$ can be for example at least 4.5 dl/g, more preferably at least 4.8 dl/g, even more preferably at least 5.0 dl/g. Preferably, $IV_{EPR}$ can be for example at most 6.5, more preferably at most 6.0.

Preferably, $IV_{PP}$ is 1.0-2.0, more preferably 1.0-1.8, more preferably 1.1-1.5, more preferably 1.2-1.4.

In some embodiments of the invention, the propylene polymer of the matrix phase can be made only from a propylene polymer having a melt flow index (MFI) of at least 150 dg/min, preferably at least 180 dg/min, even more preferred at least 200 dg/min as determined by ISO1133:2005 at 230° C. and 2.16 kg. In the sense of the present invention, the expression "made only from" as used above is understood to mean that the propylene polymer constituting the matrix phase is not made by mixing a propylene polymer having a melt flow index (MFI) of less than 150 dg/min, preferably less than 180 dg/min, even more preferred less than 200 dg/min as determined by ISO1133:2005 at 230° C. and 2.16 kg with a propylene polymer having a melt flow index (MFI) of at least 150 dg/min, preferably at least 180 dg/min, even more preferred at least 200 dg/min as determined by ISO1133:2005 at 230° C. and 2.16 kg, but instead the propylene polymer constituting the matrix phase is made from a single type of propylene polymer having a melt flow index (MFI) of at least 150 dg/min, preferably at least 180 dg/min, even more preferred at least 200 dg/min as determined by ISO1133:2005 at 230° C. and 2.16 kg or mixing more than one types of propylene polymers having a melt flow index (MFI) of at least 150 dg/min as, preferably at least 180 dg/min, even more preferred at least 200 dg/min determined by ISO1133:2005 at 230° C. and 2.16 kg. This may allow to reduce processing steps and processing time by avoiding the need for an extra mixing/compounding step. Moreover, in the case of mixing different polypropylene polymers, the addition of polypropylene which has a low Mw may increase VOC/FOG emission values.

The molecular weight distribution of the propylene polymer of the matrix phase can be strongly influenced by the manner in which it was processed/produced. For example, a unimodal molecular weight distribution may be achieved for a propylene homopolymer produced in a reactor, whereas bimodal or multimodal distribution will usually be obtained when mixing/compounding polypropylene homopolymers having for example different average molecular weights, different molecular weight distributions or different MFIs. The molecular weight distribution of the propylene polymer of the matrix phase can thereby in turn influence properties of the heterophasic propylene copolymer. For example, a heterophasic propylene copolymer in which the propylene polymer of the matrix phase has an unimodal molecular weight distribution and has a melt flow index (MFI) for example of at least 150 dg/min, preferably at least 180 dg/min, even more preferred at least 200 dg/min as determined by ISO1133:2005 at 230° C. and 2.16 kg may have a higher stiffness compared to a heterophasic propylene copolymer in which the propylene polymer of the matrix phase has a bimodal or multimodal molecular weight distribution. In some embodiments of the present invention, the propylene polymer of the matrix phase can thus preferably have a unimodal molecular weight distribution. The molecular weight distribution can thereby easily be determined e.g. by size exclusion chromatography.

In some embodiments of the invention, the heterophasic propylene copolymer according to the invention can have a stiffness/flexural modulus measured according to ASTM D790 at 23° C. in parallel orientation of at least 1000 MPa, preferably at least 1100 MPa, further preferred at least 1200 MPa, even further preferred 1300 MPa or even more preferred 1400 MPa.

Preferably the propylene polymer of the matrix phase has a Mw of 100-150 kg/mol, for example 110-120 kg/mol, for example about 115 kg/mol.

In some embodiments of the invention, the heterophasic propylene copolymer according to the invention can have an Izod impact strength determined according to ISO 180 4A, Test geometry: 65*12.7*3.2 mm, notch 45° according to ISO 37/2 in perpendicular orientation of at least 1.5 $kJ/m^2$ at −20° C., at least 1.5 kJ/m2 at 0° C. and/or at least 1.5 $kJ/m^2$ at 23° C.

The heterophasic propylene copolymer can for example have a fraction soluble in p-xylene (CXS) of 10-27 wt. %, preferably 10-16 wt. % measured according to ISO 16152: 2005. CXS is denoted the fraction of the polypropylene copolymer that is soluble in p-xylene at 25° C. representing for the most part amorphous ethylene-propylene copolymer.

Preferably, the propylene polymer has an MFI of at least 210 dg/min as determined by ISO1133:2005 at 230° C. and 2.16 kg.

Preferably, the heterophasic propylene copolymer according to the invention has an MFI of 40-120 dg/min, more preferably 40-100 dg/min, most preferably 60-100 dg/min, as determined by ISO1133:2005 at 230° C. and 2.16 kg.

In principle the choice of catalyst for the preparation of the heterophasic propylene copolymer according to the invention is not critical. For example, the heterophasic copolymer may be prepared using any Ziegler-Natta type catalyst. A Ziegler-Natta type procatalyst generally comprising a solid support, a transition metal-containing catalytic species and optionally one or more internal donors. The present invention moreover relates to the heterophasic propylene copolymer prepared using a catalyst system comprising a Ziegler-Natta type procatalyst, a co-catalyst and optionally an external electron donor. The term "Ziegler-Natta" is known in the art.

The transition metal-containing solid catalyst compound comprises a transition metal halide (e.g. titanium halide, chromium halide, hafnium halide, zirconium halide, vanadium halide) supported on a metal or metalloid compound (e.g. a magnesium compound or a silica compound).

Specific examples of several types of Ziegler-Natta catalyst are disclosed below.

In one embodiment, the heterophasic propylene copolymer is prepared using a so-called TiNo catalyst. It is a magnesium-based supported titanium halide catalyst optionally comprising one or more internal donors.

Other examples of Ziegler-Natta catalysts are described below:

EP 1 273 595 of Borealis Technology discloses a process for producing an olefin polymerisation procatalyst in the form of particles having a predetermined size range, said process comprising: preparing a solution a complex of a Gp IIa metal and an electron donor by reacting a compound of said metal with said electron donor or a precursor thereof in an organic liquid reaction medium; reacting said complex, in solution, with at least one compound of a transition metal to produce an emulsion the dispersed phase of which contains more than 50 mol % of the Gp IIa metal in said complex; maintaining the particles of said dispersed phase within the average size range 10 to 200 mu m by agitation in the presence of an emulsion stabilizer and solidifying said particles; and recovering, washing and drying said particles to obtain said procatalyst.

EP 0 019 330 of Dow discloses a Ziegler-Natta type catalyst composition. Said olefin polymerization catalyst composition comprising: a) a reaction product of an organo aluminium compound and an electron donor, and b) a solid component which has been obtained by halogenating a magnesium compound with the formula $MgR^1R^2$ wherein $R^1$ is an alkyl, aryl, alkoxide or aryloxide group and $R^2$ is an alkyl, aryl, alkoxide or aryloxide group or halogen, with a halide of tetravalent titanium in the presence of a halohydrocarbon, and contacting the halogenated product with a tetravalent titanium compound.

The Examples of U.S. Pat. No. 5,093,415 of Dow disclose an improved process to prepare a catalyst. Said process includes a reaction between titanium tetrachloride, diisobutyl phthalate, and magnesium diethoxide to obtain a solid material. This solid material is then slurried titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Example 2 of U.S. Pat. No. 6,825,146,2 of Dow discloses another improved process to prepare a catalyst. Said process includes a reaction between titanium tetrachloride in solution with a precursor composition—prepared by reacting magnesium diethoxide, titanium tetraethoxide, and titanium tetrachloride, in a mixture of orthocresol, ethanol and chlorobenzene—and ethylbenzoate as electron donor. The mixture was heated and a solid was recovered. To the solid titanium tetrachloride, a solvent and benzoylchloride were added. The mixture was heated to obtain a solid product. The last step was repeated. The resulting solid procatalyst was worked up to provide a catalyst.

U.S. Pat. No. 4,771,024 discloses the preparation of a catalyst on column 10, line 61 to column 11, line 9. The section "catalyst manufacture on silica" is incorporated into the present application by reference. The process comprises combining dried silica with carbonated magnesium solution (magnesium diethoxide in ethanol was bubbled with $CO_2$). The solvent was evaporated at 85° C. The resulting solid was washed and a 50:50 mixture of titanium tetrachloride and chlorobenzene was added to the solvent together with ethylbenzoate. The mixture was heated to 100° C. and liquid filtered. Again TiCl4 and chlorobenzene were added, followed by heating and filtration. A final addition of TiCl4 and chlorobenzene and benzoylchloride was carried out, followed by heating and filtration. After washing the catalyst was obtained.

WO03/068828 discloses a process for preparing a catalyst component on page 91 "preparation of solid catalyst components" which section is incorporated into the present application by reference. Magnesium chloride, toluene, epoxy chloropropane and tributyl phosphate were added under nitrogen to a reactor, followed by heating. Then phthalic anhydride was added. The solution was cooled to −25° C. and $TiCl_4$ was added dropwise, followed by heating. An internal donor was added (1,3-diphenyl-1,3-propylene glycol dibenzoate, 2-methyl-1,3-diphenyl-1,3-propylene glycol dibenzoate, 1,3-diphenyl-1,3-propylene-glycol diproprionate, or 1,3-diphenyl-2-methyl-1,3-propylene glycol diproprionate) and after stirring a solid was obtained and washed. The solid was treated with $TiCl_4$ in toluene twice, followed by washing to obtain said catalyst component.

U.S. Pat. No. 4,866,022 discloses a catalyst component comprises a product formed by: A. forming a solution of a magnesium-containing species from a magnesium carbonate or a magnesium carboxylate; B. precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R, or a halogen: C. reprecipitating such solid particles from a mixture containing a cyclic ether; and D. treating the reprecipitated particles with a transition metal compound and an electron donor. This process for preparing a catalyst is incorporated into the present application by reference.

The procatalyst may be produced by any method known in the art.

The procatalyst may also be produced as disclosed in WO96/32426A; this document discloses a process for the polymerization of propylene using a catalyst comprising a catalyst component obtained by a process wherein a compound with formula $Mg(OAlk)_xCl_y$, wherein x is larger than 0 and smaller than 2, y equals 2-x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate.

Preferably, the Ziegler-Natta type procatalyst in the catalyst system according to the present invention is obtained by the process as described in WO 2007/134851 A1. In Example I the process is disclosed in more detail. Example I including all sub-examples (IA-IE) is incorporated into the present description. More details about the different embodiments are disclosed starting on page 3, line 29 to page 14 line 29. These embodiments are incorporated by reference into the present description.

In the following part of the description the different steps and phases of the process for preparing the procatalyst will be discussed.

The process for preparing a procatalyst for example comprises the following phases:

Phase A): preparing a solid support for the procatalyst;

Phase B): optionally activating said solid support obtained in phase A) using one or more activating compounds to obtain an activated solid support;

Phase C): contacting said solid support obtained in phase A) or said activated solid support in phase B) with a catalytic species wherein phase C) comprises one of the following:

i. contacting said solid support obtained in phase A) or said activated solid support in phase B) with a catalytic species to obtain said procatalyst; or ii. contacting said solid support obtained in phase A) or said activated solid support in phase B) with a catalytic species and one or more internal donors to obtain said procatalyst; or iii. contacting said solid support obtained in phase A) or said activated solid support in phase B) with a catalytic species and one or more internal donors to obtain an intermediate product; or iv. contacting said solid support obtained in phase A) or said activated solid support in phase B) with a catalytic species and an activator to obtain an intermediate product;

optionally Phase D: modifying said intermediate product obtained in phase C) wherein phase D) comprises on of the following:

i. modifying said intermediate product obtained in phase C) with a Group 13- or transition metal modifier in case an internal donor was used during phase C), in order to obtain a procatalyst;

ii. modifying said intermediate product obtained in phase C) with a Group 13- or transition metal modifier and one or more internal donors in case an activator was used during phase C), in order to obtain a procatalyst.

The procatalyst thus prepared can be used in polymerization of olefins using an external donor and a co-catalyst.

The various steps used to prepare the catalyst are described in more detail below.

Phase A: Preparing a Solid Support for the Catalyst

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used.

Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283 222A1, EP1222 214B1; U.S. Pat. Nos. 5,077,357; 5,556, 820; 4,414,132; 5,106,806 and 5,077,357 but the present process is not limited to the disclosure in these documents.

Preferably, the process for preparing the solid support for the procatalyst according to the present invention comprises the following steps: step o) which is optional and step i).

Step o) preparation of the Grignard reagent (optional)

Step i) reacting a Grignard compound with a silane compound

Step o) Preparation of the Grignard Reagent (Optional)

A Grignard reagent, $R^4zMgX^4_{2-z}$ used in step i) may be prepared by contacting metallic magnesium with an organic halide $R^4X^4$, as described in WO 96/32427 A1 and WO01/23441 A1. All forms of metallic magnesium may be used, but preferably use is made of finely divided metallic magnesium, for example magnesium powder. To obtain a fast reaction it is preferable to heat the magnesium under nitrogen prior to use.

$R^4$ is a hydrocarbyl group independently selected from alkyl, alkenyl, aryl, aralkyl, alkylaryl, or alkoxycarbonyl groups, wherein said hydrocarbyl group may be linear, branched or cyclic, and may be substituted or unsubstituted; said hydrocarbyl group preferably having between 1 and 20 carbon atoms or combinations thereof. The $R^4$ group may contain one or more heteroatoms.

$X^4$ is selected from the group of consisting of fluoride (F—), chloride (Cl—), bromide (Br—) or iodide (I—).

The value for z is in a range of larger than 0 and smaller than 2: $0<z<2$

Combinations of two or more organic halides $R^4X^4$ can also be used.

The magnesium and the organic halide $R^4X^4$ can be reacted with each other without the use of a separate dispersant; the organic halide $R^4X^4$ is then used in excess.

The organic halide $R^4X^4$ and the magnesium can also be brought into contact with one another and an inert dispersant. Examples of these dispersants are: aliphatic, alicyclic or aromatic dispersants containing from 4 up to 20 carbon atoms.

Preferably, in this step o) of preparing $R^47 MgX^4_{2-z}$, also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used. Preferably, an excess of chlorobenzene is used as the organic halide $R^4X^4$. Thus, the chlorobenzene serves as dispersant as well as organic halide $R^4X^4$.

The organic halide/ether ratio acts upon the activity of the procatalyst. The chlorobenzene/dibutyl ether volume ratio may for example vary between 75:25 and 35:65, preferably between 70:30 and 50:50.

Small amounts of iodine and/or alkyl halides can be added to cause the reaction between the metallic magnesium and the organic halide $R^4X^4$ to proceed at a higher rate. Examples of alkyl halides are butyl chloride, butyl bromide and 1,2-dibromoethane. When the organic halide $R^4X^4$ is an alkyl halide, iodine and 1,2-dibromoethane are preferably used.

The reaction temperature for step o) of preparing $R^4_zMgX^4_{2-z}$ normally is between 20 and 150° C.; the reaction time is normally between 0.5 and 20 hours. After the reaction for preparing $R^4_zMgX^4_{2-z}$ is completed, the dissolved reaction product may be separated from the solid residual products. The reaction may be mixed. The stirring speed can be determined by a person skilled in the art and should be sufficient to agitate the reactants.

Step i) Reacting a Grignard Compound with a Silane Compound

Step i): contacting a compound $R^4_zMgX^4_{2-z}$—wherein $R_4$, $X^4$, and z are as discussed above—with an alkoxy- or aryloxy-containing silane compound to give a first intermediate reaction product. Said first intermediate reaction product is a solid magnesium-containing support.

In step i) a first intermediate reaction product is thus prepared by contacting the following reactants: * a Grignard reagent—being a compound or a mixture of compounds of formula $R^4_zMgX^4_{2-z}$ and * an alkoxy- or aryloxy-containing silane compound. Examples of these reactants are disclosed for example in WO 96/32427 A1 and WO01/23441 A1.

The compound $R^4_zMgX^4_{2-z}$ used as starting product is also referred to as a Grignard compound. In $R^4_zMgX^4_{2-z}$, $X^4$ is preferably chlorine or bromine, more preferably chlorine.

$R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl, benzyl, phenyl, naphthyl, thienyl, indolyl. In a preferred embodiment of the invention, $R^4$ represents an aromatic group, for instance a phenyl group.

In the Grignard compound of formula $R^4_zMgX^4_{2-z}$ z is preferably from about 0.5 to 1.5.

The compound $R^4_zMgX^4_{2-z}$ may be prepared in an optional step (step o) which is discussed above), preceding step i) or may be obtained from a different process.

It is explicitly noted that it is possible that the Grignard compound used in step i) may alternatively have a different structure, for example, may be a complex. Such complexes are already known to the skilled person in the art; a particular example of such complexes is $Phenyl_4Mg_3Cl_2$.

The alkoxy- or aryloxy-containing silane used in step i) is preferably a compound or a mixture of compounds with the general formula $Si(OR^5)_{4-n}R^6_n$.

It should be noted that the $R^5$ group is the same as the $R^1$ group. The $R^1$ group originates from the $R^5$ group during the synthesis of the first intermediate reaction product.

$R^5$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, tert-butyl, pentyl or hexyl; most preferably, selected from ethyl and methyl.

$R^6$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, tert-butyl, or cyclopentyl.

The value for n is in the range of 0 up to 4, preferably n is from 0 up to and including 1.

Examples of suitable silane-compounds include tetramethoxysilane, tetraethoxysilane, methyltrimethoxysilane, methyltributoxysilane, phenyltriethoxy-silane, diethyldiphenoxysilane, n-propyltriethoxysilane, diisopropyldimethoxysilane, diisobutyldimethoxysilane, n-propyltrimethoxysilane, cyclohexyl-methyldimethoxysilane, dicyclopentyldimethoxy-silane, isobutylisopropyldimethoxyl-silane, phenyl-trimethoxysilane, diphenyl-dimethoxysilane, trifluoropropylmethyl-dimethoxysilane, bis(perhydroisoquinolino)-dimethoxysilane, dicyclohexyldimethoxysilane, dinorbornyl-dimethoxysilane, di(n-propyl)dimethoxysilane, di(iso-propyl)-dimethoxysilane, di(n-butyl)dimethoxysilane and/or di(iso-butyl)dimethoxysilane.

Preferably, tetraethoxy-silane is used as silane-compound in preparing the solid Mg-containing compound during step i) in the process according to the present invention.

Preferably, in step i) the silane-compound and the Grignard compound are introduced simultaneously to a mixing device to result in particles of the first intermediate reaction product having advantageous morphology. This is for example described in WO 01/23441 A1. Here, 'morphology' does not only refer to the shape of the particles of the solid Mg-compound and the catalyst made therefrom, but also to the particle size distribution (also characterized as span), its fines content, powder flowability, and the bulk density of the catalyst particles. Moreover, it is well known that a polyolefin powder produced in polymerization process using a catalyst system based on such procatalyst has a similar morphology as the procatalyst (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability.

As discussed above, the reactants are preferably introduced simultaneously. With "introduced simultaneously" is meant that the introduction of the Grignard compound and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, both compounds are introduced continuously to a mixing device.

The mixing device can have various forms; it can be a mixing device in which the silane-compound is premixed with the Grignard compound, the mixing device can also be a stirred reactor, in which the reaction between the compounds takes place. The separate components may be closed to the mixing device by means of peristaltic pumps.

Preferably, the compounds are premixed before the mixture is introduced to the reactor for step i). In this way, a procatalyst is formed with a morphology that leads to polymer particles with the best morphology (high bulk density, narrow particle size distribution, (virtually) no fines, excellent flowability).

The Si/Mg molar ratio during step i) may range from 0.2 to 20. Preferably, the Si/Mg molar ratio is from 0.4 to 1.0.

The period of premixing of the reactants in above indicated reaction step may vary between wide limits, for instance 0.1 to 300 seconds. Preferably premixing is performed during 1 to 50 seconds.

The temperature during the premixing step of the reactants is not specifically critical, and may for instance range between 0 and 80° C.; preferably the temperature is between 10° C. and 50° C.

The reaction between said reactants may, for instance, take place at a temperature between −20° C. and 100° C.; for example at a temperature of from 0° C. to 80° C. The reaction time is for example between 1 and 5 hours.

The mixing speed during the reaction depends on the type of reactor used and the scale of the reactor used. The mixing speed can be determined by a person skilled in the art. As a non-limiting example, mixing may be carried out at a mixing speed of between 250-300 rpm. In an embodiment, when a blade stirrer is used the mixing speed is between 220 and 280 rpm and when a propeller stirrer is used the mixing speed is between 270 and 330 rpm. The stirrer speed may be increased during the reaction. For example, during the dosing, the speed of stirring may be increased every hour by 20-30 rpm.

Preferably PhMgCl is the Grignard agent used in step i).

The first intermediate reaction product obtained from the reaction between the silane compound and the Grignard compound is usually purified by decanting or filtration followed by rinsing with an inert solvent, for instance a hydrocarbon solvent with for example 1-20 carbon atoms, like pentane, iso-pentane, hexane or heptane. The solid product can be stored and further used as a suspension in said inert solvent.

Alternatively, the product may be dried, preferably partly dried, and preferably under mild conditions; e.g. at ambient temperature and pressure.

The first intermediate reaction product obtained by this step i) may comprise a compound of the formula $Mg(OR^1)_x X'_{2-x}$, wherein:

$R^1$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms. Most preferably selected from ethyl and methyl.

$X^1$ is selected from the group of consisting of fluoride (F—), chloride (Cl—), bromide (Br—) or iodide (I—). Preferably, $X^-$ is chloride or bromine and more preferably, $X^1$ is chloride.

The value for x is in the range of larger than 0 and smaller than 2: $0<z<2$. The value for x is preferably between 0.5 and 1.5.

Phase B: Activating Said Solid Support for the Catalyst

This step of activating said solid support for the catalyst is an optional step that is not required, but is preferred, in the present invention. If this step of activation is carried out, preferably, the process for activating said solid support comprises the following step ii). This phase may comprise one or more stages.

Step ii) Activation of the Solid Magnesium Compound

Step ii): contacting the solid $Mg(OR^1)_x X_{2-x}$ with at least one activating compound selected from the group formed by activating electron donors and metal alkoxide compounds of formula $M^1(OR^2)_{v-w}(OR^3)_w$ or $M^2(OR^2)_{v-w}(R^3)_w$, wherein:

$R^2$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms, such as for example methyl, ethyl, n-propyl, isopropyl, n-butyl, sec-butyl, iso-butyl, tert-butyl, pentyl or hexyl; most preferably selected from ethyl and methyl.

$R^3$ is a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. Preferably, said hydrocarbyl group is an alkyl group, preferably having between 1 and 20 carbon atoms, more preferably between 1-12 carbon atoms, even more preferably between 1 and 6 carbon atoms; most preferably selected from methyl, ethyl, n-propyl, isopropyl, n-butyl, sec-butyl, iso-butyl, tert-butyl, and cyclopentyl.

$M^1$ is a metal selected from the group consisting of Ti, Zr, Hf, Al or Si; v is the valency of $M^1$; $M^2$ is a metal being Si; v is the valency of $M^2$ and w is smaller than v.

The electron donors and the compounds of formula $M(OR^2)_{v-w}(OR^3)_w$ and $M(OR^2)_{v-w}(R^3)_w$ may be also referred herein as activating compounds.

In this step either one or both types of activating compounds (viz. activating electron donor or metal alkoxides) may be used.

The advantage of the use of this activation step prior to contacting the solid support with the halogen-containing titanium compound (process phase C) is that a higher yield of polyolefins is obtained per gram of the procatalyst. Moreover, the ethylene sensitivity of the catalyst system in the copolymerisation of propylene and ethylene is also increased because of this activation step. This activation step is disclosed in detail in WO2007/134851 of the present applicant.

Examples of suitable activating electron donors that may be used in step ii) are known to the skilled person and described herein below, i.e. include carboxylic acids, carboxylic acid anhydrides, carboxylic acid esters, carboxylic acid halides, alcohols, ethers, ketones, amines, amides, nitriles, aldehydes, alkoxides, sulphonamides, thioethers, thioesters and other organic compounds containing one or more hetero atoms, such as nitrogen, oxygen, sulphur and/or phosphorus.

Preferably, an alcohol is used as the activating electron donor in step ii). More preferably, the alcohol is a linear or branched aliphatic or aromatic alcohol having 1-12 carbon atoms. Even more preferably, the alcohol is selected from methanol, ethanol, butanol, isobutanol, hexanol, xylenol and benzyl alcohol. Most preferably, the alcohol is ethanol or methanol, preferably ethanol.

Suitable carboxylic acids as activating electron donor may be aliphatic or (partly) aromatic. Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides as activating electron donors are the halides of the carboxylic acids mentioned above, for instance acetyl chloride, acetyl bromide, propionyl chloride, butanoyl chloride, butanoyl iodide, benzoyl bromide, p-toluyl chloride and/or phthaloyl dichloride.

Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination. Preferably, the alcohol is ethanol or hexanol.

Examples of suitable ethers are diethyl ether, dibutyl ether, diisoamyl ether, anisole and ethylphenyl ether, 2,2-diisobutyl-1,3-dimethoxypropane, 2,2-dicyclopentyl-1,3-dimethoxypropane, 2-ethyl-2-butyl-1,3-dimethoxypropane, 2-isopropyl-2-isopentyl-1,3-dimethoxypropane and/or 9,9-bis(methoxymethyl) fluorene. Also, cyclic ethers like tetrahydrofuran (THF), or tri-ethers can be used.

Suitable examples of other organic compounds containing a heteroatom as activating electron donor include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

Examples of suitable metal alkoxides for use in step ii) are metal alkoxides of formulas: $M^1(OR^2)_{v-w}(OR^3)_w$ and $M^2(OR^2)_{v-w}(R^3)_w$ wherein $M^1$, $M^2$, $R^2$, $R^3$, v, and w are as defined above. $R^2$ and $R^3$ can also be aromatic hydrocarbon groups, optionally substituted with e.g. alkyl groups and can contain for example from 6 to 20 carbon atoms. The $R^2$ and $R^3$ preferably comprise 1-12 or 1-8 carbon atoms. In preferred embodiments $R^2$ and $R^3$ are ethyl, propyl or butyl; more preferably all groups are ethyl groups.

Preferably, $M^1$ in said activating compound is Ti or Si. Si-containing compounds suitable as activating compounds are the same as listed above for step i).

The value of w is preferably 0, the activating compound being for example a titanium tetraalkoxide containing 4-32 carbon atoms in total from four alkoxy groups. The four alkoxide groups in the compound may be the same or may differ independently. Preferably, at least one of the alkoxy groups in the compound is an ethoxy group. More preferably the compound is a tetraalkoxide, such as titanium tetraethoxide.

In the preferred process to prepare the procatalyst, one activating compound can be used, but also a mixture of two or more compounds may be used.

A combination of a compound of $M^1(OR^2)_{v-w}(OR^3)_w$ or $M^2(OR^2)_{v-w}(R^3)_w$ with an electron donor is preferred as activating compound to obtain a catalyst system that for example shows high activity, and of which the ethylene sensitivity can be affected by selecting the internal donor; which is specifically advantageous in preparing copolymers of for example propylene and ethylene.

Preferably, a Ti-based compound, for example titanium tetraethoxide, is used together with an alcohol, like ethanol or hexanol, or with an ester compound, like ethylacetate, ethylbenzoate or a phthalate ester, or together with an ether, like dibutylether, or with pyridine.

If two or more activating compounds are used in step ii) their order of addition is not critical, but may affect catalyst performance depending on the compounds used. A skilled person may optimize their order of addition based on some experiments. The compounds of step ii) can be added together or sequentially.

Preferably, an electron donor compound is first added to the compound with formula $Mg(OR^1)_xX^1_{2-x}$ where after a compound of formula $M^1(OR^2)_{v-w}(OR^3)_w$ or $M^2(OR^2)_{v-w}(R^3)_w$ as defined herein above is added. The activating compounds preferably are added slowly, for instance during a period of 0.1-6, preferably during 0.5-4 hours, most preferably during 1-2.5 hours, each.

The first intermediate reaction product that is obtained in step i) can be contacted—when more than one activating compound is used—in any sequence with the activating compounds. In one embodiment, an activating electron donor is first added to the first intermediate reaction product and then the compound $M^1(OR^2)_{v-w}(OR^3)_w$ or $M^2(OR^2)_{v-w}(R^3)_w$ is added; in this order no agglomeration of solid particles is observed. The compounds in step ii) are preferably added slowly, for instance during a period of 0.1-6, preferably during 0.5-4 hours, most preferably during 1-2.5 hours, each.

The molar ratio of the activating compound to $Mg(OR^1)_xX^1_{2-x}$ may range between wide limits and is, for instance, between 0.02 and 1.0. Preferably the molar ratio is between 0.05 and 0.5, more preferably between 0.06 and 0.4, or even between 0.07 and 0.2.

The temperature in step ii) can be in the range from −20° C. to 70° C., preferably from −10° C. to 50° C., more preferably in the range from −5° C. to 40° C., and most preferably in the range between 0° C. and 30° C.

Preferably, at least one of the reaction components is dosed in time, for instance during 0.1 to 6, preferably during 0.5 to 4 hours, more particularly during 1-2.5 hours.

The reaction time after the activating compounds have been added is preferably between 0 and 3 hours.

The mixing speed during the reaction depends on the type of reactor used and the scale of the reactor used. The mixing speed can be determined by a person skilled in the art and should be sufficient to agitate the reactants.

The inert dispersant used in step ii) is preferably a hydrocarbon solvent. The dispersant may be for example an aliphatic or aromatic hydrocarbon with 1-20 carbon atoms. Preferably, the dispersant is an aliphatic hydrocarbon, more preferably pentane, iso-pentane, hexane or heptane, heptane being most preferred.

Starting from a solid Mg-containing product of controlled morphology obtained in step i), said morphology is not negatively affected during treatment with the activating compound during step ii). The solid second intermediate reaction product obtained in step ii) is considered to be an adduct of the Mg-containing compound and the at least one activating compound as defined in step ii), and is still of controlled morphology.

The obtained second intermediate reaction product after step ii) may be a solid and may be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Phase C: Contacting Said Solid Support with the Catalytic Species and Optionally One or More Internal Donors or an Activator.

Phase C: contacting the solid support with a catalytic species. This step can take different forms, such as i) contacting said solid support with a catalytic species to obtain said procatalyst; ii) contacting said solid support with the catalytic species and one or more internal donors to obtain said procatalyst; iii) contacting said solid support with a catalytic species and one or more internal donors to obtain an intermediate product; iv) contacting said solid support with a catalytic species and an activator donor to obtain an intermediate product.

Phase C may comprise several stages. During each of these consecutive stages the solid support is contacted with said catalytic species. In other words, the addition or reaction of said catalytic species may be repeated one or more times.

For example, during stage I of phase C said solid support (first intermediate) or the activated solid support (second intermediate) is first contacted with said catalytic species and optionally subsequently with one or more internal donors. When a second stage is present, during stage II the intermediate product obtained from stage I will be contacted with additional catalytic species which may the same or different than the catalytic species added during the first stage and optionally one or more internal donors. In case three stages are present, stage III is preferably a repetition of stage II or may comprise the contacting of the product obtained from phase II with both a catalytic species (which may be the same or different as above) and one or more internal donors. In other words, an internal donor may be added during each of these stages or during two or more of these stages. When an internal donor is added during more than one stage it may be the same or a different internal donor.

An activator according to the present invention—if used—may be added either during stage I or stage II or stage III. An activator may also be added during more than one stage.

Preferably, the process of contacting said solid support with the catalytic species and an internal donor comprises the following step iii).

Step iii) Reacting the Solid Support with a Transition Metal Halide

Step iii) reacting the solid support with a transition metal halide (e.g. titanium, chromium, hafnium, zirconium, vanadium) but preferably titanium halide. In the discussion below only the process for a titanium-base Ziegler-Natta procatalyst is disclosed, however, the application is also applicable to other types of Ziegler-Natta procatalysts.

Step iii): contacting the first or second intermediate reaction product, obtained respectively in step i) or ii), with a halogen-containing Ti-compound and optionally an internal electron donor or activator to obtain a third intermediate product.

Step iii) can be carried out after step i) on the first intermediate product or after step ii) on the second intermediate product.

The molar ratio in step iii) of the transition metal to the magnesium preferably is between 10 and 100, most preferably, between 10 and 50.

Preferably, an internal electron donor is also present during step iii). Also mixtures of internal electron donors can be used. Examples of internal electron donors are disclosed below.

The molar ratio of the internal electron donor relative to the magnesium may vary between wide limits, for instance between 0.02 and 0.75. Preferably, this molar ratio is between 0.05 and 0.4; more preferably between 0.1 and 0.4; and most preferably between 0.1 and 0.3.

During contacting the second intermediate product and the halogen-containing titanium compound, an inert dispersant is preferably used. The dispersant preferably is chosen such that virtually all side products formed are dissolved in the dispersant. Suitable dispersants include for example aliphatic and aromatic hydrocarbons and halogenated aromatic solvents with for instance 4-20 carbon atoms. Examples include toluene, xylene, benzene, heptane, o-chlorotoluene and chlorobenzene.

The reaction temperature during step iii) is preferably between 0° C. and 150° C., more preferably between 50° C. and 150° C., and more preferably between 100° C. and 140° C. Most preferably, the reaction temperature is between 110° C. and 125° C.

The reaction time during step iii) is preferably between 10 minutes and 10 hours. In case several stages are present, each stage can have a reaction time between 10 minutes and 10 hours. The reaction time can be determined by a person skilled in the art based on the reactor and the catalyst composition.

The mixing speed during the reaction depends on the type of reactor used and the scale of the reactor used. The mixing speed can be determined by a person skilled in the art and should be sufficient to agitate the reactants.

The obtained reaction product may be washed, usually with an inert aliphatic or aromatic hydrocarbon or halogenated aromatic compound, to obtain the procatalyst of the invention. If desired the reaction and subsequent purification steps may be repeated one or more times. A final washing is preferably performed with an aliphatic hydrocarbon to result in a suspended or at least partly dried procatalyst, as described above for the other steps.

Optionally an activator is present during step iii) of Phase C instead of an internal donor, this is explained in more detail below in the section of activators.

The molar ratio of the activator relative to the magnesium may vary between wide limits, for instance between 0.02 and 0.5. Preferably, this molar ratio is between 0.05 and 0.4; more preferably between 0.1 and 0.3; and most preferably between 0.1 and 0.2.

Phase D: Modifying Said Catalyst with a Metal-Based Modifier.

This phase D is optional in the present invention. In a preferred process for modifying the supported catalyst, this phase consists of the following steps:

Step iv) modifying the third intermediate product with a metal-modifier to yield a modified intermediate product;

Step v) contacting said modified intermediate product with a titanium halide and optionally on or more internal donors to obtain the present procatalyst.

The order of addition, viz. the order of first step iv) and subsequently step v) is considered to be very important to the formation of the correct clusters of Group 13- or transition metal and titanium forming the modified and more active catalytic centre.

Each of these steps is disclosed in more detail below.

It should be noted that the steps iii), iv) and v) (viz. phases C and D) are preferably carried out in the same reactor, viz. in the same reaction mixture, directly following each other.

Preferably step iv) is carried out directly after step iii) in the same reactor. Preferably, step v) is carried out directly after step iv) in the same reactor.

Step iv): Group 13- or Transition Metal Modification

The modification with Group 13- or transition metal, preferably aluminium, ensures the presence of Group 13- or transition metal in the procatalyst, in addition to magnesium (from the solid support) and titanium (from the titanation treatment).

Without wishing to be bound by any particular theory, the present invention believe that one possible explanation is that the presence of Group 13- or transition metal increases the reactivity of the active site and hence increases the yield of polymer.

Step iv) comprises modifying the third intermediate product obtained in step iii) with a modifier having the formula $MX_3$, wherein M is a metal selected from the Group 13 metals and transition metals of the IUPAC periodic table of elements, and wherein X is a halide to yield a modified intermediate product.

Step iv) is preferably carried out directly after step iii), more preferably in the same reactor and preferably in the same reaction mixture. In an embodiment, a mixture of aluminum trichloride and a solvent, e.g. chlorobenzene, is added to the reactor after step iii) has been carried out. After the reaction has completed a solid is allowed to settle which can either be obtained by decanting or filtration and optionally purified or a suspension of which in the solvent can be used for the following step, viz. step v).

The metal modifier is preferably selected from the group of aluminium modifiers (e.g. aluminium halides), boron modifiers (e.g. boron halides), gallium modifiers (e.g. gallium halides), zinc modifiers (e.g. zinc halides), copper modifiers (e.g. copper halides), thallium modifiers (e.g. thallium halides), indium modifiers (e.g. indium halides), vanadium modifiers (e.g. vanadium halides), chromium modifiers (e.g. chromium halides), iron modifiers (e.g. iron halides).

Examples of suitable modifiers are aluminum trichloride, aluminum tribromide, aluminum triiodide, aluminum trifluoride, boron trichloride, boron tribromide boron triiodide, boron trifluoride, gallium trichloride, gallium tribromide, gallium triiodide, gallium trifluoride, zinc dichloride, zinc dibromide, zinc diiodide, zinc difluoride, copper dichloride, copper dibromide, copper diiodide, copper difluoride, copper chloride, copper bromide, copper iodide, copper fluoride, thallium trichloride, thallium tribromide, thallium triiodide, thallium trifluoride, thallium chloride, thallium bromide, thallium iodide, thallium fluoride, Indium trichloride, indium tribromide, indium triiodide, indium trifluoride, vanadium trichloride, vanadium tribromide, vanadium triiodide, vanadium trifluoride, chromium trichloride, chromium dichloride, chromium tribromide, chromium dibromide, iron dichloride, iron trichloride, iron tribromide, iron dichloride, iron triiodide, iron diiodide, iron trifluoride, iron difluoride.

The amount of metal halide added during step iv) may vary according to the desired amount of metal present in the procatalyst. It may for example range between 0.1 to 5 wt. % based on the total weight of the support, preferably between 0.5 and 1.5 wt. % was carried out directly after step iii) in the same reactor.

The metal halide is preferably mixed with a solvent prior to the addition to the reaction mixture. The solvent for this step may be selected from for example aliphatic and aromatic hydrocarbons and halogenated aromatic solvents with for instance 4-20 carbon atoms. Examples include toluene, xylene, benzene, decane, o-chlorotoluene and chlorobenzene. The solvent may also be a mixture or two or more thereof.

The duration of the modification step may vary from between 1 minute and 120 minutes, preferably between 40 and 80 minutes, more preferably between 50 and 70 minutes. This time is dependent on the concentration of the modifier, the temperature, the type of solvent used etc.

The modification step is preferably carried out at elevated temperatures (e.g. between 50 and 120° C., preferably between 90 and 110° C.).

The modification step may be carried out while stirring. The mixing speed during the reaction depends on the type of reactor used and the scale of the reactor used. The mixing speed can be determined by a person skilled in the art. As a non-limiting example, mixing may be carried at a stirring speed from 100 to 400 rpm, preferably from 150 to 300 rpm, more preferably about 200 rpm).

The wt/vol ratio for the metal halide and the solvent in step iv) is between 0.01 gram-0.1 gram:5.0-100 ml.

The modified intermediate product is present in a solvent. It can be kept in that solvent after which the following step v) is directly carried out. However, it can also be isolated and/or purified. The solid can be allowed to settle by stopping the stirring. The supernatant can than be removed by decanting. Otherwise, filtration of the suspension is also possible. The solid product may be washed once or several times with the same solvent used during the reaction or another solvent selected from the same group described above. The solid may be resuspended or may be dried or partially dried for storage.

Subsequent to this step, step v) is carried out to produce the procatalyst according to the present invention.

Step v): Titanation of Intermediate Product

This step is very similar to step iii). It contains the additional titanation of the modified intermediate product.

Step v) contacting said modified intermediate product obtained in step iv) with a halogen-containing titanium compound to obtain the procatalyst according to the present invention. When an activator is used during step iii) an internal donor is used during this step.

Step v) is preferably carried out directly after step iv), more preferably in the same reactor and preferably in the same reaction mixture.

In an embodiment, at the end of step iv) or at the beginning of step v) the supernatant was removed from the solid modified intermediate product obtained in step iv) by filtration or by decanting. To the remaining solid, a mixture of titanium halide (e.g. tetrachloride) and a solvent (e.g. chlorobenzene) can be added. The reaction mixture is subsequently kept at an elevated temperature (e.g. between 100 and 130° C., such as 115° C.) for a certain period of time (e.g. between 10 and 120 minutes, such as between 20 and 60 minutes, e.g. 30 minutes). After this, a solid substance was allowed to settle by stopping the stirring.

The molar ratio of the transition metal to the magnesium preferably is between 10 and 100, most preferably, between 10 and 50.

Optionally, an internal electron donor is also present during this step. Also mixtures of internal electron donors can be used. Examples of internal electron donors are disclosed below. The molar ratio of the internal electron donor relative to the magnesium may vary between wide limits, for instance between 0.02 and 0.75. Preferably, this molar ratio is between 0.05 and 0.4; more preferably between 0.1 and 0.4; and most preferably between 0.1 and 0.3.

The solvent for this step may be selected from for example aliphatic and aromatic hydrocarbons and halogenated aromatic solvents with for instance 4-20 carbon atoms. The solvent may also be a mixture or two or more thereof.

According to a preferred embodiment of the present invention this step v) is repeated, in other words, the supernatant is removed as described above and a mixture of titanium halide (e.g. tetrachloride) and a solvent (e.g. chlorobenzene) is added. The reaction is continued at elevated temperatures during a certain time which can be same or different from the first time step v) is carried out.

The step may be carried out while stirring. The mixing speed during the reaction depends on the type of reactor used and the scale of the reactor used. The mixing speed can be determined by a person skilled in the art. This can be the same as discussed above for step iii).

Thus, step v) can be considered to consist of at least two sub steps in this embodiment, being:
v-a) contacting said modified intermediate product obtained in step iv) with titanium tetrachloride—optionally using an internal donor—to obtain a partially titanated procatalyst;
v-b) contacting said partially titanated procatalyst obtained in step v-a) with titanium tetrachloride to obtain the procatalyst.

Additional sub steps can be present to increase the number of titanation steps to four or higher.

The solid substance (procatalyst) obtained was washed several times with a solvent (e.g. heptane), preferably at elevated temperature, e.g. between 40 and 100° C. depending on the boiling point of the solvent used, preferably between 50 and 70° C. After this, the procatalyst, suspended in solvent, was obtained. The solvent can be removed by filtration or decantation. The procatalyst can be used as such wetted by the solvent or suspended in solvent or it can be first dried, preferably partly dried, for storage. Drying can e.g. be carried out by low pressure nitrogen flow for several hours.

Thus in this embodiment, the total titanation treatment comprises three phases of addition of titanium halide: the first phase of addition is separated from the second and third phases of addition by the modification with metal halide.

It could be said that the difference between the prior art and the present invention is that the titanation step (viz. the step of contacting with a titanium halide) according to the present invention is split into two parts and a Group 13- or transition metal modification step is introduced between the two parts or stages of the titanation. Preferably the first part of the titanation comprises one single titanation step and the second part of the titanation comprises two subsequent titanation steps. When this modification is carried out before the titanation step the increase in activity was less as observed by the inventors. When this modification is carried out after the titanation step the increase in activity was less as observed by the present inventors.

In short, an embodiment of the present invention comprises the following steps: i) preparation of first intermediate reaction product; ii) activation of solid support to yield second intermediate reaction product; iii) first titanation or Stage I to yield third intermediate reaction product; iv) modification to yield modified intermediate product; v) second titanation or Stage II/III to yield the procatalyst.

The procatalyst may have a titanium, hafnium, zirconium, chromium or vanadium (preferably titanium) content of from about 0.1 wt % to about 6.0 wt %, based on the total solids weight, or from about 1.0 wt % to about 4.5 wt %, or from about 1.5 wt % to about 3.5 wt %.

The weight ratio of titanium, hafnium, zirconium, chromium or vanadium (preferably titanium) to magnesium in the solid procatalyst may be between about 1:3 and about 1:160, or between about 1:4 and about 1:50, or between about 1:6 and 1:30. Weight percent is based on the total weight of the procatalyst.

The transition metal-containing solid catalyst compound according to the present invention comprises a transition metal halide (e.g. titanium halide, chromium halide, hafnium halide, zirconium halide, vanadium halide) supported on a metal or metalloid compound (e.g. a magnesium compound or a silica compound).

Preferably, a magnesium-based or magnesium-containing support is used in the present invention. Such a support is prepared from magnesium-containing support-precursors, such as magnesium halides, magnesium alkyls and magnesium aryls, and also magnesium alkoxy and magnesium aryloxy compounds.

The support may be activated using activation compounds as described in more detail above under Phase B.

The catalyst may further be activated during Phase C as discussed above for the process. This activation increases the yield of the resulting catalyst composition in olefin polymerisation.

Several activators can be used, such as benzamide, alkylbenzoates, and monoesters. Each of these will be discussed below.

A benzamide activator has a structure according to formula X:

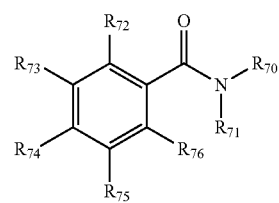

$R^{70}$ and $R^{71}$ are each independently selected from hydrogen or an alkyl. Preferably, said alkyl has between 1 and 6 carbon atoms, more preferably between 1-3 carbon atoms. More preferably, $R^{70}$ and $R^{71}$ are each independently selected from hydrogen or methyl.

$R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluormethyl)benzamide, N,N-dimethyl-2-(trifluormethyl)benzamide, 3-(trifluormethyl)benzamide, N,N-dimethyl-3-(trifluormethyl)benzamide, 2,4-dihydroxy-N-(2-hydroxyethyl)benzamide, N-(1H-benzotriazol-1-ylmethyl)benzamide, 1-(4-ethylbenzoyl)piperazine, 1-benzoylpiperidine.

It has surprisingly been found by the present inventors that when the benzamide activator is added during the first stage of the process together with the catalytic species or directly after the addition of the catalytic species (e.g. within 5 minutes) an even higher increase in the yield is observed compared to when the activator is added during stage II or stage III of the process.

It has surprisingly been found by the present inventors that the benzamide activator having two alkyl groups (e.g. dimethylbenzamide or diethylbenzamide, preferably dimethylbenzamide) provides an even higher increase in the yield than either benzamide or monoalkyl benzamide.

Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

Alkylbenzoates may be used as activators. The activator may hence be selected from the group alkylbenzoates having an alkylgroup having between 1 and 10, preferably between 1 and 6 carbon atoms. Examples of suitable alkyl benzoates are methylbenzoate, ethylbenzoate according to Formula II, n-propylbenzoate, iso-propylbenzoate, n-butylbenzoate, 2-butylbenzoate, t-butylbenzoate.

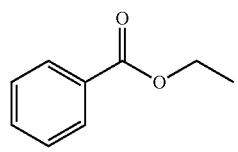

Formula II

More preferably, the activator is ethylbenzoate. In an even more preferred embodiment, ethylbenzoate as activator is added during step iii) and a benzamide internal donor is added during step v), most preferably 4-[benzoyl(methyl)amino]pentan-2-yl benzoate according to Formula XII (above).

Mono-esters may be used as activators. The monoester according to the present invention can be any ester of a monocarboxylic acid known in the art. The structures according to Formula V are also mono-esters but are not explained in this section, see the section on Formula V. The monoester can have the formula XXIII $R^{94}$—CO—O$R^{95}$ Formula XXIII $R^{94}$ and $R^{95}$ are each independently selected from a hydrogen or a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. When $R^{94}$ is an aryl, this structure is similar to Formula V. Examples of aromatic mono-esters are discussed with reference to formula V.

Preferably said mono-ester is an aliphatic monoester. Suitable examples of mono-esters include formates, for instance, butyl formate; acetates, for instance ethyl acetate, amyl acetate and butyl acetate; acrylates, for instance ethyl acrylate, methyl methacrylate and isobutyl methacrylate. More preferably, the aliphatic monoester is an acetate. Most preferably, the aliphatic monoester is ethyl acetate.

In an embodiment, the monoester used in step iii) is an ester of an aliphatic monocarboxylic acid having between 1 and 10 carbon atoms, wherein $R^{94}$ is an aliphatic hydrocarbyl group.

The molar ratio between the monoester in step iii) and Mg may range from 0.05 to 0.5, preferably from 0.1 to 0.4, and most preferably from 0.15 to 0.25.

The monoester is not used as a stereospecificity agent, like usual internal donors are known to be in the prior art. The monoester is used as an activator.

Without to be bound by any theory, the inventors believe that the monoester used in the process according to the present invention participates at the formation of the magnesium halogen (e.g. MgCl$_2$) crystallites during the interaction of Mg-containing support with titanium halogen (e.g. TiCl$_4$). The monoester may form intermediate complexes with Ti and Mg halogen compounds (for instance, TiCl$_4$, TiCl$_3$(OR), MgCl$_2$, MgCl(OEt), etc.), help to the removal of titanium products from solid particles to mother liquor and affect the activity of final catalyst. Therefore, the monoester according to the present invention can also be referred to as an activator.

As used herein, an "internal electron donor" or an "internal donor" is a compound added during formation of the procatalyst that donates a pair of electrons to one or more metals present in the resultant procatalyst. Not bounded by any particular theory, it is believed that the internal electron donor assists in regulating the formation of active sites thereby enhancing catalyst stereoselectivity.

The internal electron donor can be any compound known in the art to be used as internal electron donor. Suitable examples of internal donors include aromatic acid esters, such as monocarboxylic acid ester or dicarboxylic acid esters (e.f. ortho-dicarboxylic acid esters such as phthalic acid esters), (N-alkyl)amidobenzoates, 1,3-diethers, silyl esters, fluorenes, succinates and/or combinations thereof.

An aromatic acid ester can be used as internal donor.

As used herein, an "aromatic acid ester" is a monocarboxylic acid ester (also called "benzoic acid ester") as shown in Formula V, a dicarboxylic acid ester (e.g. an o-dicarboxylic acid also called "phthalic acid ester") as shown in Formula VI:

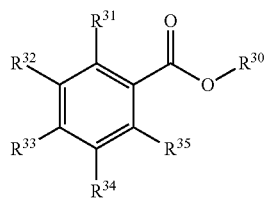

(Formula V)

$R^{30}$ is selected from a hydrocarbyl group independently selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{31}$, $R^{32}$, $R^{33}$, $R^{34}$, $R^{35}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzoic acid esters" include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

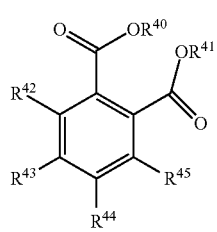

(Formula VI)

$R^{40}$ and $R^{41}$ are each independently a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{42}$, $R^{43}$, $R^{44}$, $R^{45}$ are each independently selected from hydrogen, a halide or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of phthalic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. The phthalic acid ester is preferably di-n-butyl phthalate or diisobutyl phthalate.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990).

The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst represented by the formula $R^{20}_3Al$.

$R^{20}$ is independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. On the proviso that at least one $R^{20}$ is a hydrocarbyl group. Optionally, two or three $R^{20}$ groups are joined in a cyclic radical forming a heterocyclic structure.

Non-limiting examples of suitable $R^{20}$ groups are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of the hydrocarbyl aluminum compounds as co-catalyst include triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, triisobutylaluminium, and/or trioctylaluminium. Most preferably, triethylaluminium (abbreviated as TEAL).

The co-catalyst can also be a hydrocarbyl aluminum compound represented by the formula $R^{21}_m AlX^{21}_{3-m}$.

$R^{21}$ is an alkyl group. Said alkyl group may be linear, branched or cyclic. Said alkyl group may be substituted or unsubstituted. Preferably, said alkyl group has between 1 and 20 carbon atoms, more preferably between 1-12 carbon atoms, even more preferably between 1 and 6 carbon atoms.

Non-limiting examples of suitable $R^{21}$ groups are: methyl, ethyl, propyl, isopropyl, butyl, isobutyl, tert-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl.

$X^{21}$ is selected from the group of consisting of fluoride (F—), chloride (Cl—), bromide (Br—) or iodide (I—) or an alkoxide (RO). The value for m is preferably 1 or 2.

Non-limiting examples of suitable alkyl aluminium halide compounds for co-catalyst include tetraethyl-dialuminoxane, methylaluminoxane, isobutylaluminoxane, tetraisobutyl-dialuminoxane, diethyl-aluminumethoxide, diisobutyl-aluminum chloride, methylaluminum dichloride, diethylaluminum chloride, ethylaluminum dichloride and dimethylaluminum chloride.

Non-limiting examples of suitable compounds include tetraethyldialuminoxane, methylaluminoxane, isobutylaluminoxane, tetraisobutyldialuminoxane, diethylaluminum ethoxide, diisobutylaluminum chloride, methylaluminum dichloride, diethylaluminum chloride, ethylaluminum dichloride and dimethylaluminum chloride.

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

One of the functions of an external donor compound is to affect the stereoselectivity of the catalyst system in polymerization of olefins having three or more carbon atoms. Therefore it may be also referred to as a selectivity control agent.

Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes.

The aluminium/external donor molar ratio in the polymerization catalyst system preferably is between 0.1 and 200; more preferably between 1 and 100.

Mixtures of external donors may be present and may include from about 0.1 mol % to about 99.9% mol % of a first external donor and from about 99.9 mol % to about 0.1 mol % of either a second or the additional alkoxysilane external donor disclosed below.

When a silane external donor is used, the Si/Ti molar ratio in the catalyst system can range from 0.1 to 40, preferably from 0.1 to 20, even more preferably from 1 to 20 and most preferably from 2 to 10.

Alkyl-alkoxysilanes according to Formula IV may preferably be used as external donors:

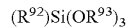  Formula IV

The $R^{92}$ and $R^{93}$ groups are each independently an alkyl having between 1 and 10 carbon atoms. Said alkyl group may be linear, branched or cyclic. Said alkyl group may be substituted or unsubstituted. Preferably, said hydrocarbyl group has between 1 and 8 carbon atoms, even more preferably between 1 and 6 carbon atoms, even more preferably between 2 and 4 carbon atoms. Preferably, all three $R^{93}$ groups are the same. Preferably $R^{93}$ is methyl or ethyl. Preferably $R^{92}$ is ethyl or propyl, more preferably n-propyl.

Examples are n-propyl triethoxysilane (nPTES) and n-propyl trimethoxysilane (nPTMS).

Typical external donors known in the art (for instance as disclosed in documents WO2006/056338A1, EP1838741B1, U.S. Pat. No. 6,395,670B1, EP398698A1, WO96/32426A) are organosilicon compounds having general formula $Si(OR^a)_{4-n}R^b_n$, wherein n can be from 0 up to 2, and each $R^a$ and $R^b$, independently, represents an alkyl or aryl group, optionally containing one or more hetero atoms for instance O, N, S or P, with, for instance, 1-20 carbon atoms; such as n-propyl trimethoxysilane (nPTMS), n-propyl triethoxysilane (nPEMS), diisobutyl dimethoxysilane (DiBDMS), tert-butyl isopropyl dimethyxysilane (tBiPDMS), cyclohexyl methyldimethoxysilane (CHMDMS), dicyclopentyl dimethoxysilane (DCPDMS), di(iso-propyl) dimethoxysilane (DiPDMS) or di(iso-butyl) dimethoxysilane (diBDMS).

There may be additional compound(s) present in the external donor, for example these compound(s) may be one or more alkoxysilanes. The alkoxysilane compound can have any of the structures disclosed herein. The alkoxysilane is described by Formula IX

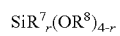 (Formula IX)

$R^7$ is independently a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 6-12 carbon atoms, even more preferably between 3 and 12 carbon atoms. For example, $R^7$ may be C6-12 aryl, alkyl or aralkyl, C3-12 cycloalkyl, C3-12 branched alkyl, or C3-12 cyclic or acyclic amino group.

For the formula $SiNR^7r(OR^8)_{4-r}R^7$ may also be hydrogen.

$R^8$ is independently selected from a hydrogen or a hydrocarbyl, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms, more preferably between 1-12 carbon atoms, even more preferably between 1 and 6 carbon atoms. For example, $R^8$ may be C1-4 alkyl, preferably methyl or ethyl Non-limiting examples of suitable silane-compounds include tetramethoxysilane (TMOS or tetramethyl orthosilicate), tetraethoxysilane (TEOS or tetraethyl orthosilicate), methyl trimethoxysilane, methyl triethoxysilane, methyl tripropoxysilane, methyl tributoxysilane, ethyl trimethoxysilane, ethyl triethoxysilane, ethyl tripropoxysilane, ethyl tributoxysilane, n-propyl trimethoxysilane, n-propyl triethoxysilane, n-propyl tripropoxysilane, n-propyl tributoxysilane, isopropyl trimethoxysilane, isopropyl triethoxysilane, isopropyl tripropoxysilane, isopropyl tributoxysilane, phenyl trimethoxysilane, phenyl triethoxysilane, phenyl tripropoxysilane, phenyl tributoxysilane, cyclopentyl trimethoxysilane, cyclopentyl triethoxysilane, diethylamino triethoxysilane, dimethyl dimethoxysilane, dimethyl diethoxysilane, dimethyl dipropoxysilane, dimethyl dibutoxysilane, diethyl dimethoxysilane, diethyl diethoxysilane, diethyl dipropoxysilane, diethyl dibutoxysilane, di-n-propyl dimethoxysilane, d-n-propyl diethoxysilane, di-n-propyl dipropoxysilane, di-n-propyl dibutoxysilane, diisopropyl dimethoxysilane, diisopropyl diethoxysilane, diisopropyl dipropoxysilane, diisopropyl dibutoxysilane, diphenyl dimethoxysilane, diphenyl diethoxysilane, diphenyl dipropoxysilane, diphenyl dibutoxysilane, dicyclopentyl dimethoxysilane, dicyclopentyl diethoxysilane, diethyl diphenoxysilane, di-tert-butyl dimethoxysilane, methyl cyclohexyl dimethoxysilane, ethyl cyclohexyl dimethoxysilane, isobutyl isopropyl dimethoxysilane, tert-butyl isopropyl dimethoxysilane, trifluoropropyl methyl dimethoxysilane, bis(perhydroisoquinolino) dimethoxysilane, dicyclohexyl dimethoxysilane, dinorbornyl dimethoxysilane, cyclopentyl pyrrolidino dimethoxysilane and bis(pyrrolidino) dimethoxysilane.

In an embodiment, the silane-compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof.

Preferably, the heterophasic propylene copolymer is prepared using a catalyst composition comprising a Ziegler-Natta catalyst, an external donor and optionally a co-catalyst, wherein the external donor is represented by formula IV

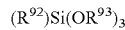
(R$^{92}$)Si(OR$^{93}$)$_3$                        Formula IV wherein the R$^{92}$ and R$^{93}$ groups are each independently an alkyl having from 1 to 10 carbon atoms. Said alkyl group may be linear, branched or cyclic. Said alkyl group may be substituted or unsubstituted. Preferably, said hydrocarbyl group has from 1 to 8 carbon atoms, even more preferably from 1 to 6 carbon atoms, even more preferably from 2 to 4 carbon atoms. Preferably, all three R$^{93}$ groups are the same. Preferably R$^{93}$ is methyl or ethyl. Preferably R$^{92}$ is ethyl or propyl, more preferably n-propyl, preferably n-propyl triethoxy silane is used as an external donor.

It was advantageously found that the heterophasic propylene copolymer made using the catalyst composition comprising a Ziegler-Natta catalyst, an external donor of Formula IV and optionally a co-catalyst has a low FOG-value and low VOC-value as defined below.

For purpose of the invention, the VOC-value, the FOG-value, the amount of butanol emitted, the amount of acetone emitted and the amount of isopropenylacetylbenzene and the amount of diacetyl benzene are measured on a sample taken within 1 hour after it was prepared by melt-mixing and stored in airtight bags for no longer than 24 hours at a maximum temperature of 23° C.

Preferably, the amount of volatile compounds (FOG-value) of the copolymer according to the invention as measured through the FOG-value according to VDA278 on the second heating (first heating 30 min at 90° C., second heating 1 hour at 120° C.) is less than 500 ppm, for example less than 400 ppm, for example less than 350 ppm, for example less than 300 ppm, for example less than 250 ppm, for example less than 200 ppm, for example less than 150 ppm based on the total composition.

Preferably, the VOC-value of the copolymer according to the invention according to VDA278 (30 min, 90° C.) and determined by gas chromatography can for example be less than 1500 ppm, preferably less than 1300 ppm, more preferably less than 1000 ppm, for example less than 750 ppm, for example less than 600 ppm, for example less than 500 ppm, for example less than 400 ppm, for example less than 300 ppm based on the total composition.

Heterophasic propylene copolymers are generally prepared in one or more reactors, by polymerization of propylene polymer in the presence of a catalyst and subsequent polymerization of a propylene-α-olefin mixture. The resulting polymeric materials are heterophasic, but the specific morphology usually depends on the preparation method and monomer ratio.

The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. Nos. 4,399,054 and 4,472,524. Accordingly, the present invention provides a process for the preparation of the heterophasic propylene copolymer according to the invention comprising preparing the propylene polymer in a first reactor in the presence of a catalyst and preparing the ethylene-α-olefin elastomer in the presence of a catalyst and the propylene polymer obtained in the first reactor and ethylene. The present invention also provides a heterophasic propylene copolymer obtained or obtainable by such a process.

It is known to add peroxides to the heterophasic propylene copolymer to obtain impact propylene copolymers having a higher melt flow rate. This makes it for example possible to obtain several impact propylene copolymers with different melt flow rates from one and the same base grade.

Organic peroxides are known to be used for viscosity reduction. There are different ways in which the organic peroxides behave in conventional degradation processes upon heating and melting conditions. On one hand, under certain process conditions, the peroxides initially decompose to produce free radicals, which then abstract hydrogen from a tertiary carbon of the polypropylene backbone to form free radicals on the polymer, and which further recombine. On the other hand, peroxides initiate a breakage of the longest chains of the polymer molecules and, subsequently, this results in a decrease in viscosity of the polymer, an increase in melt flow rate, and a narrower molecular weight distribution, characteristics which are directly responsible for improved flow properties of polypropylene in order to make the product more suitable for certain applications. The extent of each type of behaviour is generally influenced by the nature and concentration of the peroxide.

Examples of organic peroxides are well known and include dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, α,α'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate.

In some embodiments, the copolymer according to the invention has been melt-mixed with a peroxide, such as organic peroxides mentioned above.

In preferred embodiments, the copolymer according to the invention is prepared without using a peroxide. It was found that a better tiger stripe performance is exhibited at an equal MFI of the copolymer by the absence of the peroxide. The absence of the use of the peroxide in the preparation of the copolymer can be verified by the copolymer comprising no detectable amount of the peroxide.

The invention further relates to a heterophasic propylene composition comprising the heterophasic polypropylene copolymer according to the invention and additives. The additives may include stabilisers, e.g. heat stabilisers, antioxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; inorganic fillers such as talc and reinforcing agents; and/or components that enhance interfacial bonding between polymer and filler, such as a maleated polypropylene. The skilled person can readily select any suitable combination of additives and additive amounts without undue experimentation. The amount of the additives depends on their type and function and typically is of from 0 to about 30 wt %. The amount of the additives may e.g. be from about 1 to about 20 wt %; from about 2 to about 10 wt % or of from 3 to about 5 wt % based on the total composition.

In particular, the heterophasic propylene composition may comprise from 1 to 25 wt %, preferably from 5 wt % to 20 wt %, more preferably from 5 wt % to 15 wt % of an inorganic filler such as talc, based on the weight of the composition. In preferred embodiments, the heterophasic propylene composition may further comprise from 1-25 wt % (e.g., 8 to 25 wt %), based on the weight of the composition, of an ethylene α-olefin copolymer elastomer, preferably selected from one or more of an ethylene octene copolymer elastomer and an ethylene butene copolymer elastomer, even more preferably selected from one or more of an metallocene ethylene octene copolymer elastomer and a metallocene ethylene butene copolymer elastomer. In particularly preferred embodiments, the heterophasic propylene composition comprises 5-15 wt % of the inorganic filler such as talc and 5-15 wt % of the α-olefin copolymer elastomer.

The heterophasic propylene composition of the invention may be obtained by a process comprising melt-mixing the heterophasic copolymer according to the invention, any peroxide and additives by using any suitable means. Preferably, the heterophasic propylene composition of the invention is made in a form that allows easy processing into a shaped article in a subsequent step, like in pellet or granular form. The composition can be a mixture of different particles or pellets; like a blend of the heterophasic copolymer and a masterbatch of additives, Preferably, the heterophasic propylene composition of the invention is in pellet or granular form as obtained by mixing all components in an apparatus like an extruder; the advantage being a composition with homogeneous and well-defined concentrations of the additives.

With melt-mixing is meant that the additives and optionally the peroxide are mixed with the heterophasic propylene copolymer at a temperature that exceeds the melting point of the heterophasic propylene copolymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 180° C. in the feed zone to 300° C. at the die. Preferably, the temperature in the extruder varies from 200 to 265° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

The residence time in the extruder for the heterophasic propylene copolymer may be lower than 1 minute, for example between 10 and 40 seconds.

It can easily be determined by the person skilled in the art through routine experimentation how much peroxide should be used to obtain a composition having the desired melt flow index. This also depends on the half-life of the peroxide and on the conditions used for the melt-mixing, which in turn depend on the exact composition of the heterophasic propylene copolymer.

Typically, the amount of peroxide used will lie in the range of 0.02 to 0.5 wt % based on the heterophasic propylene copolymer.

The heterophasic propylene composition may then be processed by any conventional technique known in the art into a shaped article. Suitable examples include injection moulding, injection blow moulding, injection stretch blow moulding, rotational moulding, compression moulding, extrusion and extrusion compression moulding, extrusion blow moulding, sheet extrusion, film extrusion, cast film extrusion, foam extrusion, and thermoforming.

The invention therefore further relates to a shaped article comprising the copolymer according to the invention or the heterophasic propylene composition according to the invention. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging.

The invention further relates to a heterophasic propylene copolymer according to the invention having a tiger stripe rating at least 8, more preferably at least 9, most preferably 10, according to the method and twelve conditions as defined in the experimental section of the description. The invention further relates to a heterophasic propylene composition according to the invention having a tiger stripe rating at least 6, preferably at least 7, more preferably at least 8, more preferably at least 9, most preferably 10, according to the method and twelve conditions as defined in the experimental section of the description. The method involves preparing a fan gate sample and a pin point gate sample under three injection speeds and observing their smooth side and rough side. The conditions can be summarized as:

i) injection speed of 20 mm/sec, smooth side of a fan gate sample,
ii) injection speed of 20 mm/sec, smooth side of a pin point gate sample,
iii) injection speed of 20 mm/sec, rough side of a fan gate sample,
iv) injection speed of 20 mm/sec, rough side of a pin point gate sample
v) injection speed of 50 mm/sec, smooth side of a fan gate sample,
vi) injection speed of 50 mm/sec, smooth side of a pin point gate sample,
vii) injection speed of 50 mm/sec, rough side of a fan gate sample,
viii) injection speed of 50 mm/sec, rough side of a pin point gate sample.
ix) injection speed of 160 mm/sec, smooth side of a fan gate sample,
x) injection speed of 160 mm/sec, smooth side of a pin point gate sample,
xi) injection speed of 160 mm/sec, rough side of a fan gate sample,
xii) injection speed of 160 mm/sec, rough side of a pin point gate sample.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The range of values "A to B" used herein is understood to mean "at least A and at most B".

The invention is now elucidated by way of the following examples, without however being limited thereto.

EXAMPLES

Preparation of Heterophasic Copolymer

Gas-phase polymerizations were performed in a set of two horizontal, cylindrical reactors in series, wherein a propylene homopolymer was formed in the first reactor and an ethylene-propylene copolymer rubber in the second one to prepare an impact copolymer. The first reactor was operated in a continuous way, the second one in a batch manner. In the synthesis of the homopolymer, the polymer was charged into the secondary reactor blanketed with nitrogen. The first reactor was equipped with an off-gas port for recycling reactor gas through a condenser and back through a recycle line to the nozzles in the reactor. Both reactors had a volume of one gallon (3.8-liter) measuring 10 cm in diameter and 30 cm in length. In the first reactor liquid propylene was used as the quench liquid; for the synthesis of copolymers the temperature in the second reactor was kept constant by a cooling jacket. A high activity catalyst produced in accordance with U.S. Pat. No. 4,866,022 was introduced into the first reactor as a 5-7 weight percent slurry in hexane through a liquid propylene-flushed catalyst addition nozzle.

n-propyl-triethoxysilane and TEAl in hexane at an Al/Mg ratio of 9 and Al/Si ratio of 13.5 were fed to the first reactor through a different liquid propylene flushed addition nozzle. During operation, polypropylene powder produced in the first reactor passed over a weir and was discharged through a powder discharge system into the second reactor. The polymer bed in each reactor was agitated by paddles attached to a longitudinal shaft within the reactor that was rotated at about 50 rpm in the first and at about 75 rpm in the second reactor. The reactor temperature and pressure were maintained at 61° C. and 2.2 MPa in the first and for the copolymer synthesis at 66° C. and 2.2 MPa in the second reactor. The production rate was about 200-250 g/h in the first reactor in order to obtain a stable process. For the homopolymer synthesis the hydrogen concentration in the off gas was controlled such to achieve the targeted melt flow rate. For the copolymer synthesis, hydrogen was fed to the reactor to control a melt flow rate ratio over the homopolymer powder and copolymer powder. The composition of the ethylene-propylene copolymer (RCC 2) was controlled by adjusting the ratio ethylene and propylene ($C_2/C_3$) in the recycling gas in the second reactor based on gas chromatography analysis. In this respect, RCC 2 is the amount of ethylene incorporated in the rubber fraction (weight percent) and RC is the amount of rubber incorporated in the impact copolymer (weight percent). RC and RCC2 were measured with IR spectroscopy, which was calibrated using 13C-NMR according to known procedures.

Various properties of the heterophasic copolymers thus obtained were measured and are shown in Table 2, as CEx 1-2 and Ex 1-8.

MFI

Melt flow index (MFI) was determined by 1501133:2005 at 230° C. and 2.16 kg.

CXS and CXI

Amount of the xylene-soluble matter (CXS) was determined according to ISO 16152:2005, which specifies a method for determining the mass fraction of a sample which is soluble in xylene at 25° C. CXS represents the content of the ethylene-α-olefin elastomer in the heterophasic propylene copolymer. The fraction insoluble in xylene at 25° C. (CXI) fraction of the composition was determined as the difference of 100 minus the percentage CXS. CXI represents the content of the propylene polymer in the heterophasic propylene copolymer.

$IV_{PP}$ and $IV_{EPR}$

The intrinsic viscosities of the propylene polymer ($IV_{PP}$) and of the α-olefin elastomer ($IV_{EPR}$) were determined from the measured amounts of xylene soluble matter (CXS) and xylene insoluble matter (CXI) according to ISO-1628-1 and -3.

RC and RCC2

RC is the rubber content (ethylene-α-olefin elastomer) in the heterophasic copolymer; RCC2 is the C2 (ethylene) content in the rubber part of the polymer.

RC and RCC2 were measured with IR spectroscopy, which was calibrated using NMR according to known procedures.

Impact Strength

The impact strength was determined by measuring the Izod impact strength at −20° C., 0° C. and 23° C. according to ISO 180 4A, Test geometry: 65*12.7*3.2 mm, notch 45° according to ISO 37/2 in perpendicular orientation.

Flexural Modulus

The flexural modulus was determined according to ASTM D790-10 at 23° C. in parallel orientation.

FOG

The amount of volatile compounds (FOG-value) was measured through the FOG-value according to VDA278 on the second heating (first heating 30 min at 90° C., second heating 1 hour at 120° C.).

VOC (Volatile Organic Compounds)

VOC-value was measured according to VDA278 (30 min, 180° C.) and determined by gas chromatography.

Tiger Stripe Testing

Figure 2:
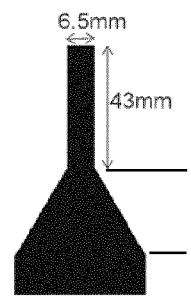
Figure 3:
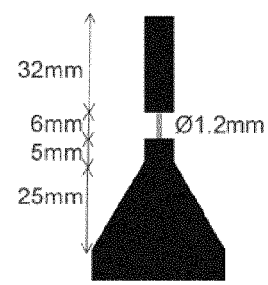

The heterophasic copolymer was injection moulded into two types of ruler-shaped test specimens using the feeding system and the mold as illustrated in FIG. 1. The details of the two types of the molds are illustrated in FIGS. 2 and 3. The two types of the molds are called a fan gate (FIG. 2) and a pin-point gate (FIG. 3).

FIG. 1 illustrates the feeding system and the mold. The molten sample was injected through a sprue having an upper end having a diameter of 4 mm and a lower end having a diameter of 7 mm. The lower end of the sprue merges with a rectangular channel of the mold, the rectangular channel having a width of 6.5 mm and a depth of 3 mm.

FIG. 2 illustrates one type of a gate system called a fan gate. After the rectangular channel having a length of 43 mm, a fan shaped part follows having a length of 25 mm. Along the length of the fan shaped part, the width changes from 6.5 mm to 30 mm and the thickness changes from 3 mm to 2 mm. After the fan shaped part, an elongated part follows having a width of 30 mm and a thickness of 3 mm.

FIG. 3 illustrates another type of a gate system called a pin-point gate. The pin-point gate is identical to the fan gate of FIG. 2 except that the rectangular channel has three regions: a first region having a length of 32 mm and a width of 6.5 mm, followed by a second region having a length of 6 mm and a width of 1.2 mm, followed by a third region having a length of 5 mm and a width of 6 mm.

The melt temperature during the injection was set to 240° C. and the mold set to room temperature. Three different screw speeds were used according to Table 1. Specimens having a smooth side and a textured side were obtained.

TABLE 1

| | Injection conditions | | |
|---|---|---|---|
| Condition | Screw speed injection [mm/sec] | Flow rate [cm³/sec] | Injection time [sec] |
| Low speed | 20 | 14.1 | 2.49-2.51 |
| Medium speed | 50 | 35.3 | 0.99-1.0 |
| High speed | 160 | 113.1 | 0.38-0.39 |

Each of the specimens was visually observed for occurrence of tiger stripes on its smooth side and textured side. The quality of the surface was evaluated on a scale of 1 to 10, 10 being the best.

| TS score | description |
|---|---|
| 1 | *very sharp transitions between glossy and dull sections visible seen from any angle |
| 2 | *sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

Compounding (Composition Comprising Copolymer and Additives)

Each of the heterophasic copolymers of Table 2 (78.75 wt %) was compounded with a mineral filler (talcum, Steamic OOSD, 10 wt %), an external modifier (ethylene-octene copolymer: Engage 8200.10 wt %) and a carbon black masterbatch (CMB PE4884 by Plasback 1 wt %), a acid/halogen scavenger based on hydrotalcite-like compounds (DHT-4A, 0.2 wt %) as well as a mixture of a trisarylphosphite based stabilizer and a phenolic antioxidant (Irganox B225, 0.05 wt %) in an extruder. The heterophasic copolymers of CEx 1-2 and Ex 1-8 were used for the preparation of the compositions of CEx 1A-2A and Ex 1A-8A, respectively.

Various properties of the compositions were measured as shown in Tables 4 and 5. Same measurement methods are used as for the measurement methods for the copolymer, except for the following:

Impact Strength

The impact strength was determined by measuring the Izod impact strength at −20° C., 0° C. and 23° C. according to ISO 180 1A, Test geometry: 65*12.7*3.2 mm, notch 45° according to ISO 37/2 in parallel orientation.

Flexural Modulus

The flexural modulus was determined according to ISO 178 at 23° C. in parallel orientation.

TABLE 2

Properties of heterophasic copolymer

| | Samples | | | | | | | | | |
|---|---|---|---|---|---|---|---|---|---|---|
| | CEx 1 | CEx 2 | Ex 1 | Ex 2 | Ex 3 | Ex 4 | Ex 5 | Ex 6 | Ex 7 | Ex 8 |
| MFI copolymer [dg/min] | 35.0 | 66.0 | 54.4 | 48.3 | 62.9 | 44.5 | 65.8 | 94.6 | 80.0 | 81.1 |
| MFI PP [dg/min] | | | 230.00 | 230.00 | 230.00 | 230.00 | 230.00 | 230.00 | 230.00 | 230.00 |
| CXS [m/m %] | 16.80 | 16.40 | 14.06 | 13.90 | 12.91 | 15.46 | | | | |
| IV (EPR) | 2.2 | 2.1 | 5 | 6 | 5.3 | 5.3 | 5.3 | 5.3 | 6 | 5 |
| IV (PP) | 1.3 | 1.3 | 1.3 | 1.3 | 1.3 | 1.3 | 1.3 | 1.3 | 1.3 | 1.3 |
| IV(EPR)/IV(PP) | 1.69 | 1.62 | 3.85 | 4.62 | 4.08 | 4.08 | 4.08 | 4.08 | 4.62 | 3.85 |
| RC [wt %] | 18.50 | 18.50 | 14.05 | 14.63 | 14.45 | 17.38 | 12.00 | 8.00 | 10.00 | 10.00 |
| RCC2 [wt %] | 55.00 | 55.00 | 39.85 | 44.10 | 45.92 | 49.65 | 49.65 | 49.65 | 44.10 | 39.85 |
| Izod −20° C., L (kJ/m$^2$) | 3.6 | 3.18 | 2.04 | 2.42 | 2.07 | 3.11 | 2.74 | 1.95 | 1.89 | 1.88 |
| Izod 0° C., L (kJ/m$^2$) | 4.26 | 3.68 | 1.86 | 2.34 | 2.04 | 3.43 | 2.84 | 1.78 | 1.67 | 1.7 |
| Izod 23° C., L (kJ/m$^2$) | 6.95 | 5.81 | 5.1 | 5.35 | 4.79 | 5.71 | 5.41 | 3.64 | 3.72 | 3.34 |
| Flexural modulus ASTM D790 (T = 23° C., II) (N/m$^2$) | 1432 | 1466 | 1346 | 1383 | 1415 | 1283 | 1415 | 1555 | 1527 | 1502 |
| VOC [µg/g] | | | 280 | 305 | 333 | 277 | 283 | 328 | 298 | 300 |
| FOG [µg/g] | | | 1000 | 1050 | 1050 | 996 | 923 | 1090 | 994 | 1020 |

Properties in the parallel and perpendicular directions are indicated with "II" and "L", respectively.

The heterophasic copolymer according to the invention has desirable mechanical properties as well as low VOC and FOG values.

TABLE 3

Tiger stripe performance of heterophasic copolymer

| | Injection speed | | | | | | | | | | | |
|---|---|---|---|---|---|---|---|---|---|---|---|---|
| | Low | | | | Medium | | | | High | | | |
| Texture | No | | Yes | | None | | Yes | | None | | Yes | |
| sample | — | • | — | • | — | • | — | • | — | • | — | • |
| CEx 1 | 8 | 8 | 8 | 8 | 8 | 7 | 8 | 8 | 8 | 6 | 8 | 8 |
| CEx 2 | 8 | 8 | 8 | 8 | 8 | 8 | 8 | 8 | 7 | 7 | 8 | 8 |
| Ex 1 | 10 | 10 | 10 | 10 | 10 | 10 | 10 | 10 | 10 | 10 | 10 | 9 |
| Ex 2 | 10 | 10 | 10 | 10 | 10 | 10 | 10 | 10 | 10 | 10 | 10 | 9 |
| Ex 3 | 10 | 10 | 10 | 10 | 10 | 10 | 10 | 10 | 10 | 9 | 10 | 9 |
| Ex 4 | 10 | 10 | 10 | 10 | 10 | 10 | 10 | 10 | 10 | 10 | 10 | 10 |
| Ex 5 | 10 | 10 | 10 | 10 | 10 | 10 | 10 | 10 | 10 | 10 | 10 | 9 |
| Ex 6 | 10 | 10 | 10 | 10 | 10 | 10 | 10 | 10 | 9 | 10 | 9 | 8 |
| Ex 7 | 10 | 10 | 10 | 10 | 10 | 10 | 10 | 10 | 9 | 10 | 9 | 9 |
| Ex 8 | 10 | 10 | 10 | 10 | 10 | 10 | 10 | 10 | 9 | 10 | 9 | 9 | mould:
— fan gate,
• pin point gate

It can be seen that the samples according to the invention exhibit excellent tiger stripe performance.

TABLE 4

Properties of compounded composition comprising heterophasic copolymer

| | Sample | | | | | | | | | |
|---|---|---|---|---|---|---|---|---|---|---|
| | CEx 1A | CEx 2A | Ex 1A | Ex 2A | Ex 3A | Ex 4A | Ex 5A | Ex 6A | Ex 7A | Ex 8A |
| PP copolymer | CEx 1 | CEx 2 | Ex 1 | Ex 2 | Ex 3 | Ex 4 | Ex 5 | Ex 6 | Ex 7 | Ex 8 |
| MFI composition [dg/min] | 24.7 | 41.9 | 39.3 | 32.4 | 43.9 | 30.5 | 42.5 | 62.6 | 53.8 | 57.9 |
| Izod 23° C. (ISO 180/1A, II) (kJ/m$^2$) | 9.5 | 7.8 | 9.0 | 9.7 | 8.2 | 10.5 | 7.8 | 5.1 | 6.3 | 6.0 |
| Izod 0° C. (ISO180/1A, II) (kJ/m$^2$) | 5.9 | 5.1 | 5.2 | 5.9 | 4.8 | 6.2 | 4.7 | 3.4 | 3.7 | 4.2 |

TABLE 4-continued

Properties of compounded composition comprising heterophasic copolymer

| | Sample | | | | | | | | | |
|---|---|---|---|---|---|---|---|---|---|---|
| | CEx 1A | CEx 2A | Ex 1A | Ex 2A | Ex 3A | Ex 4A | Ex 5A | Ex 6A | Ex 7A | Ex 8A |
| Izod −20° C. (ISO180/1A, II) (kJ/m$^2$) | 4.0 | 3.8 | 3.6 | 3.8 | 3.6 | 4.3 | 3.4 | 2.9 | 2.9 | 3.0 |
| Flexural Modulus (ISO 178) (23° C., II) (N/mm$^2$) | 1586 | 1509 | 1548 | 1537 | 1629 | 1456 | 1629 | 1750 | 1738 | 1712 |

Properties in the parallel and perpendicular directions are indicated with "II" and "L", respectively.

TABLE 5

TS performance of compounded composition comprising heterophasic copolymer

| | Injection speed | | | | | |
|---|---|---|---|---|---|---|
| | Low | | Medium | | High | |
| Texture | No | Yes | No | Yes | No | Yes |
| sample | — | • | — | • | — | • |
| 1 (CEx 1A) | 7 | 6 | 9 | 8 | 6 | 5 | 7 | 6 | 6 | 5 | 6 | 6 |
| 2 (CEx 2A) | 9 | 8 | 8 | 8 | 7 | 6 | 7 | 7 | 6 | 6 | 7 | 7 |
| 3 (Ex 1A) | 9 | 9 | 9 | 9 | 9 | 9 | 9 | 9 | 9 | 8 | 9 | 9 |
| 4 (Ex 2A) | 9 | 9 | 9 | 9 | 9 | 9 | 9 | 9 | 9 | 9 | 9 | 9 |
| 5 (Ex 3A) | 9 | 9 | 9 | 9 | 9 | 9 | 9 | 9 | 9 | 9 | 9 | 9 |
| 6 (Ex 4A) | 9 | 9 | 9 | 9 | 9 | 9 | 9 | 9 | 9 | 8 | 9 | 9 |
| 7 (Ex 5A) | 9 | 9 | 9 | 9 | 9 | 9 | 9 | 9 | 9 | 9 | 9 | 9 |
| 8 (Ex 6A) | 9 | 9 | 9 | 9 | 9 | 9 | 9 | 9 | 9 | 9 | 8 | 8 |
| 9 (Ex 7A) | 9 | 9 | 9 | 9 | 9 | 9 | 9 | 9 | 9 | 9 | 8 | 8 |
| 10 (Ex 8A) | 9 | 9 | 9 | 9 | 9 | 9 | 9 | 9 | 9 | 9 | 8 | 8 |

It can be seen that the samples according to the invention exhibit a better tiger stripe performance compared to the samples of the comparative experiments made from copolymers having an IV (EPR)/IV(PP) ratio outside of the range of 3-7.

The invention claimed is:

1. A heterophasic propylene copolymer comprising a matrix phase comprising a propylene polymer and a dispersed phase comprising an ethylene-α-olefin elastomer comprising ethylene and at least one $C_3$ to $C_{10}$ α-olefin,
    wherein the propylene polymer has an intrinsic viscosity $IV_{PP}$ and the ethylene-α-olefin elastomer has an intrinsic viscosity $IV_{EPR}$ where the ratio of $IV_{EPR}/IV_{PP}$ is 3-7,
    wherein the copolymer comprises 8-30 wt % of the ethylene-α-olefin elastomer,
    wherein the ethylene-α-olefin elastomer of the dispersed phase comprises 10-55 wt % of ethylene, and
    wherein the propylene polymer of the matrix phase is made only from propylene polymer having a melt flow index (MFI) of at least 180 dg/min as determined by ISO1133:2005 at 230° C. and 2.16 kg.

2. The copolymer according to claim 1, wherein the propylene polymer of the matrix phase is made only from a propylene polymer having a melt flow index (MFI) of at least 210 dg/min as determined by ISO1133:2005 at 230° C. and 2.16 kg.

3. The heterophasic propylene copolymer according to claim 1, wherein the propylene polymer of the matrix phase has a unimodal molecular weight distribution.

4. The heterophasic propylene copolymer according to claim 1, obtained by preparing the propylene polymer in a first reactor in the presence of a catalyst and preparing the ethylene-α-olefin elastomer in the presence of a catalyst and the propylene polymer obtained in the first reactor and ethylene.

5. The copolymer according to claim 1, wherein the ratio of $IV_{EPR}/IV_{PP}$ is 3-5.

6. The copolymer according to claim 1, wherein the copolymer comprises 10-18 wt % of the ethylene-α-olefin elastomer.

7. The copolymer according to claim 1, wherein the ethylene-α-olefin elastomer comprises 40-50 wt % of ethylene.

8. The copolymer according to claim 1, wherein the $IV_{EPR}$ is 4.5-6.5 dl/g.

9. The copolymer according to claim 1, wherein the $IV_{PP}$ is 1.0-2.0 dl/g.

10. The copolymer according to claim 1, wherein the copolymer has a tiger stripe rating of at least 8 as determined according to the method and twelve conditions as defined in the specification.

11. A heterophasic propylene composition comprising the copolymer according to claim 1 and from 1 to 25 wt % of an inorganic filler based on the weight of the composition.

12. The heterophasic propylene composition according to claim 11 further comprising from 8 25 wt %, based on the weight of the composition, of an ethylene α-olefin copolymer elastomer.

13. The heterophasic propylene composition according to claim 12 wherein the ethylene α-olefin copolymer elastomer is selected from one or more of an ethylene octene copolymer elastomer and an ethylene butene copolymer elastomer.

14. The heterophasic propylene composition according to claim 12, wherein the ethylene α-olefin copolymer elastomer is selected from one or more of an metallocene ethylene octene copolymer elastomer and a metallocene ethylene butene copolymer elastomer.

15. The heterophasic propylene composition according to claim 11, wherein the composition has a tiger stripe rating of at least 6, as determined according to the method and twelve conditions as defined in the specification.

16. An article comprising the copolymer according to claim 1.

17. The article of claim 16, further comprising from 1 to 25 wt % of an inorganic filler based on the weight of the composition.

18. The article of claim 17, wherein the article is an automotive part.

19. A heterophasic propylene copolymer comprising a matrix phase comprising a propylene polymer and a dispersed phase comprising an ethylene-α-olefin elastomer comprising ethylene and at least one $C_3$ to $C_{10}$ α-olefin, wherein the propylene polymer has an intrinsic viscosity $IV_{PP}$ and the ethylene-α-olefin elastomer has an intrinsic viscosity $IV_{EPR}$ where the ratio of $IV_{EPR}/IV_{PP}$ is 3-7, wherein the copolymer comprises 8-30 wt % of the ethylene-α-olefin elastomer, wherein the ethylene-α-olefin elastomer of the dispersed phase comprises 10-55 wt % of ethylene, and wherein the propylene polymer of the matrix phase is made only from a single type of propylene polymer having a melt flow index (MFI) of at least 200 dg/min as determined by ISO1133:2005 at 230° C. and 2.16 kg.

20. A heterophasic propylene copolymer comprising a matrix phase comprising a propylene polymer and a dispersed phase comprising an ethylene-α-olefin elastomer comprising ethylene and at least one $C_3$ to $C_{10}$ α-olefin, wherein the propylene polymer has an intrinsic viscosity $IV_{PP}$ of 1.0 to 2.0 dl/g, and the ethylene-α-olefin elastomer has an intrinsic viscosity $IV_{EPR}$ where the ratio of $IV_{EPR}/IV_{PP}$ is 3-7, wherein the copolymer comprises 8-25 wt % of the ethylene-α-olefin elastomer, wherein the ethylene-α-olefin elastomer of the dispersed phase comprises 10-55 wt % of ethylene, and wherein the propylene polymer of the matrix phase is made only from propylene polymer having an MFI of at least 180 dg/min as determined by ISO1133:2005 at 230° C. and 2.16 kg.

* * * * *